United States Patent
Yamamoto et al.

(10) Patent No.: US 12,077,187 B2
(45) Date of Patent: Sep. 3, 2024

(54) SENSING SYSTEM AND VEHICLE

(71) Applicant: KOITO MANUFACTURING CO., LTD., Tokyo (JP)

(72) Inventors: Shuki Yamamoto, Shizuoka (JP); Toru Nagashima, Shizuoka (JP); Misako Kamiya, Shizuoka (JP); Shunsuke Okamura, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 18/077,334

(22) Filed: Dec. 8, 2022

(65) Prior Publication Data
US 2023/0105832 A1   Apr. 6, 2023

Related U.S. Application Data

(62) Division of application No. 16/758,459, filed as application No. PCT/JP2018/039485 on Oct. 24, 2018, now Pat. No. 11,554,792.

(30) Foreign Application Priority Data

Oct. 26, 2017 (JP) .................. 2017-207499
Oct. 26, 2017 (JP) .................. 2017-207500

(51) Int. Cl.
*B60W 60/00* (2020.01)
*B60W 40/04* (2006.01)
(Continued)

(52) U.S. Cl.
CPC ........ *B60W 60/0017* (2020.02); *B60W 40/04* (2013.01); *G01S 7/484* (2013.01);
(Continued)

(58) Field of Classification Search
CPC . B60W 40/04; B60W 60/0017; G01S 13/865; G01S 13/867; G01S 13/931;
(Continued)

(56) References Cited

U.S. PATENT DOCUMENTS

2014/0307247 A1   10/2014   Zhu et al.
2014/0324266 A1   10/2014   Zhu et al.
(Continued)

FOREIGN PATENT DOCUMENTS

DE   102015201317 A1   7/2016
EP     2 927 710 A2    10/2015
(Continued)

OTHER PUBLICATIONS

Communication dated Jul. 12, 2021 issued by the European Patent Office in application No. 18870978.6.
(Continued)

*Primary Examiner* — Charles J Han
(74) *Attorney, Agent, or Firm* — Sughrue Mion, PLLC

(57) ABSTRACT

A sensing system provided in a vehicle capable of running in an autonomous driving mode, includes: a LiDAR unit configured to acquire point group data indicating surrounding environment of the vehicle; and a LiDAR control module configured to identify information associated with a target object existing around the vehicle, based on the point group data acquired from the LiDAR unit. The LiDAR control module is configured to control the LiDAR unit so as to increase a scanning resolution of the LiDAR unit in a first angular area in a detection area of the LiDAR unit, wherein the first angular area is an area where the target object exists.

11 Claims, 25 Drawing Sheets

(51) Int. Cl.
    *G01S 7/484*     (2006.01)
    *G01S 17/89*     (2020.01)
    *G01S 17/894*     (2020.01)
    *G01S 17/93*     (2020.01)

(52) U.S. Cl.
    CPC ............ *G01S 17/89* (2013.01); *G01S 17/894* (2020.01); *G01S 17/93* (2013.01)

(58) Field of Classification Search
    CPC ........ G01S 17/42; G01S 17/89; G01S 17/894; G01S 17/93; G01S 17/931; G01S 2013/9316; G01S 7/4817; G01S 7/484; G08G 1/166
    See application file for complete search history.

(56) References Cited

U.S. PATENT DOCUMENTS

| | | |
|---|---|---|
| 2014/0333468 A1 | 11/2014 | Zhu et al. |
| 2014/0336935 A1 | 11/2014 | Zhu et al. |
| 2015/0168556 A1 | 6/2015 | Zhu et al. |
| 2016/0274589 A1 | 9/2016 | Templeton et al. |
| 2017/0176641 A1 | 6/2017 | Zhu et al. |
| 2017/0320437 A1 | 11/2017 | Liebau et al. |
| 2018/0024246 A1* | 1/2018 | Jeong .................... G01S 7/4818 359/204.1 |
| 2018/0136314 A1* | 5/2018 | Taylor ................... G01S 17/931 |
| 2019/0079282 A1* | 3/2019 | Kitano .................. G01S 7/4972 |
| 2019/0179052 A1 | 6/2019 | Zhu et al. |

FOREIGN PATENT DOCUMENTS

| | | |
|---|---|---|
| EP | 3187895 A1 | 7/2017 |
| JP | 9-277887 A | 10/1997 |
| JP | 2012-63230 A | 3/2012 |
| JP | 2013-29375 A | 2/2013 |
| JP | 2015-175644 A | 10/2015 |
| JP | 2016-522886 A | 8/2016 |
| WO | 2017/168576 A1 | 10/2017 |

OTHER PUBLICATIONS

Communication issued Nov. 5, 2021 by the European Patent Office in European Patent Application No. 18870978.6.
International Search Report dated Jan. 29, 2019 issued by the International Searching Authority in counterpart International Application No. PCT/JP2018/039485 (PCT/ISA/210).
Written Opinion dated Jan. 29, 2019 issued by the International Searching Authority in counterpart International Application No. PCT/JP2018/039485 (PCT/ISA/237).

* cited by examiner

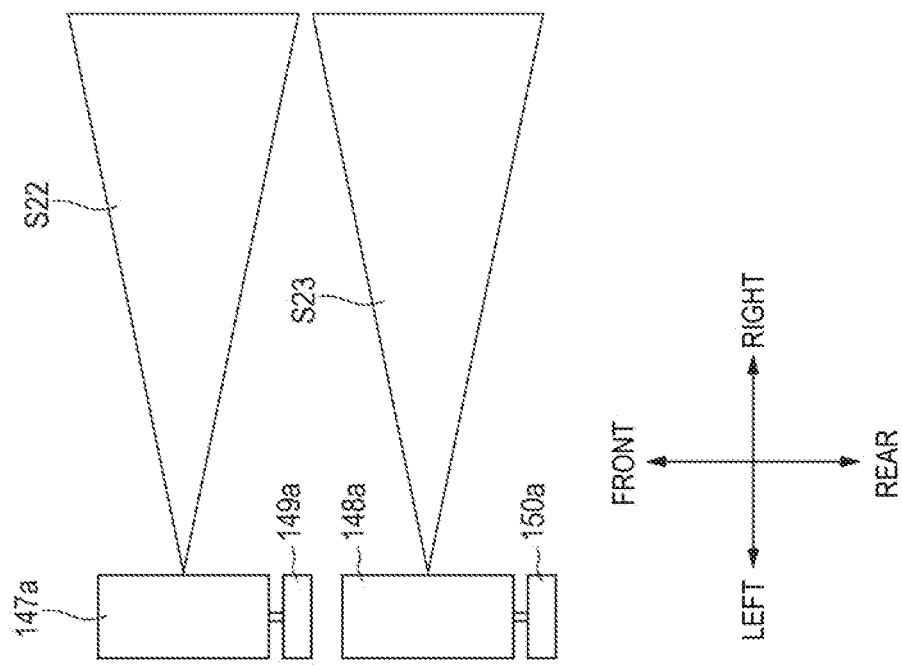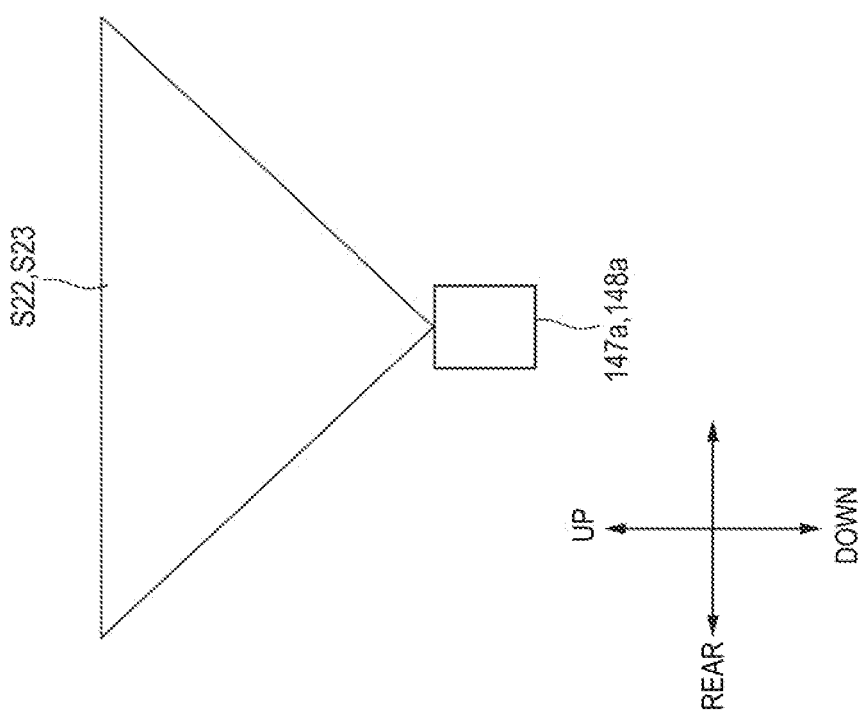

SENSING SYSTEM AND VEHICLE

CROSS-REFERENCE TO RELATED APPLICATIONS

This application is a Divisional of U.S. application Ser. No. 16/758,459, filed Apr. 23, 2020, which is a National Stage of International Application No. PCT/JP2018/039485 filed Oct. 24, 2018, claiming priority based on Japanese Patent Application No. 2017-207499, filed Oct. 26, 2017, and Japanese Patent Application No. 2017-207500, filed Oct. 26, 2017, the contents of all of which are incorporated herein by reference in their entirety

TECHNICAL FIELD

The present disclosure relates to a sensing system. In particular, the present disclosure relates to a sensing system provided on a vehicle which can run in an autonomous driving mode. In addition, the present disclosure relates to a vehicle including a sensing system and capable of running in an autonomous driving mode.

BACKGROUND ART

Currently, autonomous driving techniques for motor vehicles have vigorously been carried out in several countries, which then triggers studies on making regulations for vehicles (hereinafter, "vehicles" refer to motor vehicles.) to run on a public road in an autonomous driving mode. Here, in the autonomous driving mode, a vehicle system automatically controls the driving of a vehicle. Specifically speaking, in the autonomous driving mode, the vehicle system automatically performs at least one of a steering control (a control for controlling the traveling direction of the vehicle), a brake control, and an accelerator control (controls for controlling the braking, and acceleration or deceleration of the vehicle) based on information indicating the surrounding environment of the vehicle which is obtained from sensors such as a camera, a radar (for example, a laser radar and a millimeter wave radar) and the like. On the other hand, in a manual driving mode which will be described below, as in many conventional-type vehicles, a driver controls the driving of a vehicle. Specifically speaking, in the manual driving mode, the driving of the vehicle is controlled in accordance with various operations (a steering operation, a brake operation, an accelerator operation) performed by the driver, and a vehicle system does not automatically perform the steering control, the brake control, and accelerator control. The driving mode of a vehicle is not an idea existing only for certain types of vehicles but is an idea existing for all types of vehicles including the conventional types of vehicles that do not have an autonomous driving function, and is classified by vehicle controlling methods or the like.

Thus, in the future, a scene is anticipated to occur in which a vehicle running in the autonomous driving mode (hereinafter, referred to as an "autonomous driving vehicle") and a vehicle running in the manual driving mode (hereinafter, referred to as a "manual driving vehicle") are running together on the same public road.

As an example of an autonomous driving technique, Patent Literature 1 discloses an automatic distance controlling and tracking driving system in which a following vehicle automatically follows a preceding vehicle while controlling a distance therebetween and tracking the preceding vehicle. In the automatic distance controlling and tracking driving system, the preceding vehicle and the following vehicle both have their own lighting systems, so that character information is displayed on the lighting system of the preceding vehicle for preventing a third vehicle from barging in between the preceding and following vehicles, and character information is displayed on the lighting system of the following vehicle, indicating that the subject vehicle is now driving in the automatic distance controlling and tracking mode.

RELATED ART LITERATURE

Patent Literature

Patent Literature 1: JP-A-9-277887

SUMMARY OF THE INVENTION

Technical Problem

Incidentally, in developing the autonomous driving technology, a problem that has been tackled to be solved is enhancing remarkably the accuracy of surrounding environment information indicating a surrounding environment of a vehicle. An LiDAR unit is used to identify a surrounding environment of a vehicle, and an electronic control unit (ECU) can acquire surrounding environment information of the vehicle (for example, information on a target object existing in the surroundings of the vehicle) based on point group data acquired from the LiDAR unit. In order to improve the accuracy of information on the surrounding environment of the vehicle, it is considered to increase the scanning resolution of the LiDAR unit, but the operation load of the electronic control unit that arithmetically operates the point group data is increased remarkably as the scanning resolution of the LiDAR unit increases. In this way, a trade-off relationship exists between the improvement in the accuracy of the information on the surrounding environment of the vehicle and the operation load of the electronic control unit.

Additionally, although the LiDAR unit has a sufficiently wide detection area (detection angular area) in a horizontal direction of the vehicle, its detection area in an up-and-down direction (a vertical direction) of the vehicle becomes quite narrow. This leaves room for further improvement in the accuracy of recognition of the surrounding environment of the vehicle by expanding the detection area of the LiDAR in the up-and-down direction of the vehicle.

A first object of the present disclosure is to provide a sensing system and a vehicle that can improve the accuracy of surrounding environment information while suppressing the operation load of an electronic control unit. Additionally, a second object of the present disclosure is to provide a sensing system and a vehicle that can improve the accuracy of recognition of a surrounding environment of the vehicle.

Means for Solving the Problem

A sensing system according to one aspect of the present disclosure is provided in a vehicle capable of running in an autonomous driving mode.

The sensing system comprises:
  a LiDAR unit configured to acquire point group data indicating surrounding environment of the vehicle; and
  a LiDAR control module configured to identify information associated with a target object existing around the vehicle, based on the point group data acquired from the LiDAR unit, wherein the LiDAR control module is configured to control the LiDAR unit so as to increase a scanning resolution of the LiDAR unit in a first angular area in a detection area of the LiDAR unit, wherein the first angular area is an area where the target object exists.

Thus, according to the configuration described above, in the detection area of the LiDAR unit, the scanning resolution of the LiDAR unit in the first angular area where the target object (for example, a pedestrian) exists is increased. In this way, by increasing the scanning resolution of the LiDAR unit in the first angular area, while preventing scanning resolutions in the other detection areas than the first angular area from being increased, the accuracy of the information on the target object can be improved while suppressing an operation load of the LiDAR control module (electronic control unit). Consequently, the sensing system can be provided in which the accuracy of the surrounding environment information can be improved while suppressing the operation load of the electronic control unit.

When an attribute of the target object cannot be identified based on the point group data acquired from the LiDAR unit, the LiDAR control module may control the LiDAR unit so as to increase the scanning resolution of the LiDAR unit in the first angular area.

According to the configuration described above, even though the attribute of the target object cannot be identified based on the point group data acquired from the LiDAR unit, the attribute of the target object can be identified in an ensured fashion by increasing the scanning resolution of the LiDAR unit in the first angular area where the target object exists.

The LiDAR control module may be configured to control the LiDAR unit so as to gradually increase the scanning resolution of the LiDAR unit in the first angular area until the attribute of the target object can be identified.

According to the configuration described above, since the scanning resolution of the LiDAR unit in the first angular area is increased gradually until the attribute of the target object can be identified, the attribute of the target object can be identified in an ensured fashion.

The LiDAR control module may be configured to update a position of the target object based on point group data newly acquired from the LiDAR unit and then update the first angular area based on the updated position of the target object.

According to the configuration described above, the position of the target object is updated based on the point group data newly acquired from the LiDAR unit, and then, the first angular area is updated based on the updated position of the target object. In this way, even though the target object is moving, the scanning resolution of the LiDAR unit in the first angular area where the moving target object exists can be increased.

A vehicle capable of running in an autonomous driving mode, comprising the sensing system may be provided.

According to the configuration described above, the vehicle can be provided in which the accuracy of surrounding environment information can be improved while suppressing the operation load of the electronic control unit.

A sensing system according to one aspect of the present disclosure is provided in a vehicle capable of running in an autonomous driving mode.

The sensing system comprises:
a LiDAR unit configured to acquire point group data indicating surrounding environment of the vehicle;
a LiDAR control module configured to acquire surrounding environment information indicating the surrounding environment of the vehicle, based on the point group data acquired from the LiDAR unit;
an actuator configured to change a tilt angle of the LiDAR unit relative to an up-and-down direction of the vehicle; and
an actuator control module configured to control a driving of the actuator.

According to the configuration described above, since the tilt angle of the LiDAR unit relative to the up-and-down direction of the vehicle can be changed by use of the actuator, the detection area (detection angular range) of the LiDAR unit in the up-and-down direction can be expanded. In this way, the sensing system can be provided in which the recognition accuracy of the surrounding environment of the vehicle can be improved.

When the tilt angle of the LiDAR unit is a first tilt angle, the LiDAR unit may acquire a first frame of the point group data.

When the tilt angle of the LiDAR unit is a second tilt angle which is different from the first tilt angle, the LiDAR unit may acquire a second frame of the point group data.

The LiDAR control module acquires the surrounding environment information based on the first fame and the second frame.

According to the configuration described above, the first frame of the point group data is acquired when the tilt angle of the LiDAR unit is the first tilt angle, and the second frame of the point group data is acquired when the tilt angle of the LiDAR unit is the second tilt angle. Thereafter, the surrounding environment information is acquired based on the first frame and the second frame so acquired. In this way, since the detection area in the up-and-down direction of the LiDAR unit when the first frame is acquired differs from the detection area of the LiDAR unit in the up-and-down direction when the second frame is acquired, the detection area of the LiDAR unit in the up-and-down direction can be expanded by fusing the first frame and the second frame together.

The actuator control module may not cause the actuator to be driven during a first scanning time of the LiDAR unit during which the first frame is acquired and a second scanning time of the LiDAR unit during which the second frame is acquired.

According to the configuration described above, since the actuator is not driven during the first scanning time and the second scanning time, the scanning line of the LiDAR unit does not tilt even though the LiDAR unit tilts relative to the up-and-down direction. In this way, the operation load of the LiDAR control module that arithmetically operates the point group data can be reduced.

The actuator control module may cause the actuator to be driven during a first scanning time of the LiDAR unit during which the first frame is acquired and a second scanning time of the LiDAR unit during which the second frame is acquired.

According to the configuration described above, since the actuator is driven during the first scanning time and the second scanning time, although the scanning line of the LiDAR unit tilts, a great reduction in updating rate of surrounding environment information based on point group data can be avoided. In this way, the detection area of the LiDAR unit in the up-and-down direction can be expanded while avoiding the great reduction in updating rate of surrounding environment information based on point group data.

The actuator control module may be configured to determine whether the actuator is caused to be driven according to a current position of the vehicle.

According to the configuration described above, whether the actuator is caused to be driven is determined according to the current position of the vehicle. In other words, whether the LiDAR unit is caused to tilt relative to the up-and-down direction according to the current position of the vehicle is determined. In this way, optimum surrounding environment information according to the place where the vehicle is currently position can be obtained.

The actuator control module may be configured to determine a maximum value of the tilt angle of the LiDAR unit according to a current speed of the vehicle.

According to the configuration described above, the maximum value of the tilt angle of the LiDAR unit is determined according to the current speed of the vehicle. In this way, optimum surrounding environment information according to the current speed of the vehicle can be acquired.

The actuator control module may be configured to cause the actuator to be driven in response to a detection of a pedestrian existing around the vehicle.

According to the configuration described above, the actuator is driven in response to a detection of a pedestrian existing around the vehicle. In other words, the LiDAR unit tilts relative to the up-and-down direction when a pedestrian existing around the vehicle is detected. In this way, the accuracy of the information on the target object (for example, attribute information of the target object or the like) can be improved by expanding the detection area of the LiDAR unit in the up-and-down direction.

The actuator may be configured to gradually change the tilt angle of the LiDAR unit at a first angular interval within a predetermined angular area with respect to a horizontal direction of the vehicle.

The actuator may be configure to gradually change the tilt angle of the LiDAR unit at a second angular interval which is greater than the first angular pitch outside the predetermined angular area.

According to the configuration described above, the tilt angle of the LiDAR unit is gradually changed at the first angular interval within the predetermined angular area, while the tilt angle of the LiDAR unit is changed gradually at the second angular interval that is greater than the first angular interval outside the predetermined angular area. In this way, the scanning resolution of the LiDAR unit can be increased within the predetermined angular area, and the detection area of the LiDAR unit in the up-and-down direction can be expanded.

The LiDAR unit may comprise a first LiDAR unit and a second LiDAR unit.

The first LiDAR unit and the second LiDAR unit may be arranged to overlap with each other when seen from a top.

The actuator may comprise:
a first actuator configured to change a tilt angle of the first LiDAR unit relative to the up-and-down direction; and
a second actuator configured to change a tilt angle of the second LiDAR unit relative to the up-and-down direction.

According to the configuration described above, the detection area of the two first and second LiDAR units arranged in the up-and-down direction can be expanded by use of the two first and second LiDAR units arranged to overlap with each other when seen from the top.

A vehicle capable of running in an autonomous driving mode and comprising the sensing system may be provided.

The vehicle can be provided which can improve the recognition accuracy of the surrounding environment of the vehicle.

BRIEF DESCRIPTION OF DRAWINGS

FIG. 23A is a drawing showing detection areas in a horizontal direction of two LiDAR units arranged in the up-and-down direction.

FIG. 23B is a drawing showing the detection areas in the up-and-down direction of the two LiDAR units arranged in the up-and-down direction.

DESCRIPTION OF EMBODIMENTS

First Embodiment

Figure 1:
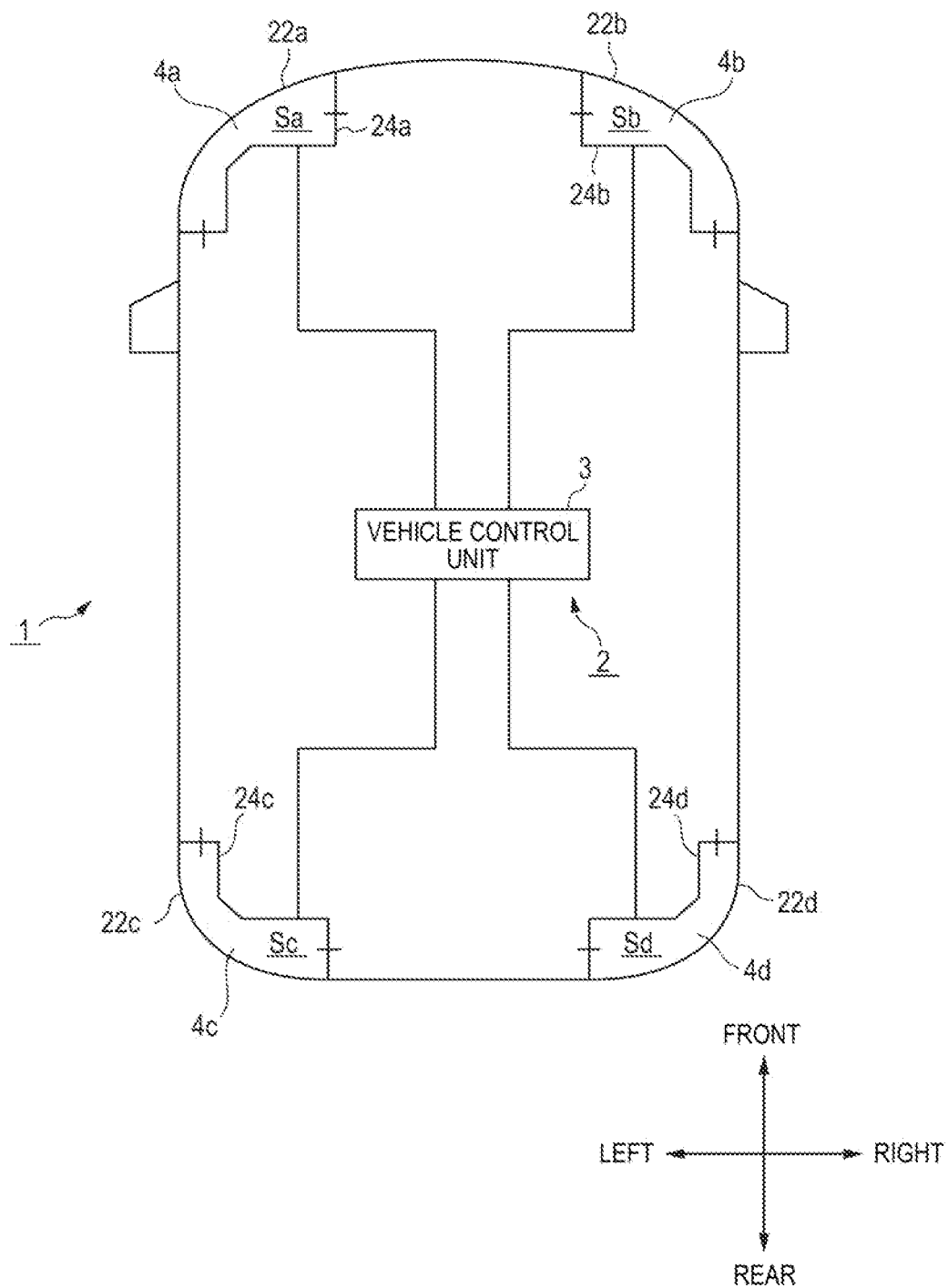
FIG. 1 is a top view of a vehicle including a vehicle system according to a first embodiment of the present invention.

Hereinafter, referring to drawings, a first embodiment of the present disclosure will be described. A description of members having like reference numerals to those of members that have already been described in the present embodiment will be omitted as a matter of convenience in description. Additionally, dimensions of members shown in the drawings may differ from time to time from actual dimensions of the members as a matter of convenience in description.

In description of the present embodiment, as a matter of convenience in description, a "left-and-right direction", a "front-and-rear direction", and an "up-and-down direction" will be referred to as required. These directions are relative directions set for a vehicle 1 shown in FIG. 1. Here, the "front-and rear direction" is a direction including a "front direction" and a "rear direction". The "left-and-right" direction is a direction including a "left direction" and a "right direction". The "up-and-down direction" is a direction including an "up direction" and a "down direction". In addition, a "horizontal direction" will also be described, and the "horizontal direction" is a direction perpendicular to the "up-and-down direction" and includes the "left-and-right direction" and the "front-and-rear direction.

At first, referring to FIG. 1, the vehicle 1 according to the present embodiment will be described. FIG. 1 is a schematic drawing showing a top view of the vehicle 1 including a vehicle system 2. As shown in FIG. 1, the vehicle 1 is a vehicle (a motor vehicle) that can run in an autonomous driving mode and includes the vehicle system 2. The vehicle system 2 includes at least a vehicle control unit 3, a left front lighting system 4a (hereinafter, referred to simply as a "lighting system 4a"), a right front lighting system 4b (hereinafter, referred to simply as a "lighting system 4b"), a left rear lighting system 4c (hereinafter, referred to simply as a "lighting system 4c"), and a right rear lighting system 4d (hereinafter, referred to simply as a "lighting system 4d").

The lighting system 4a is provided at a left front of the vehicle 1. In particular, the lighting system 4a includes a housing 24a placed at the left front of the vehicle 1 and a transparent cover 22a attached to the housing 24a. The lighting system 4b is provided at a right front of the vehicle 1. In particular, the lighting system 4b includes a housing 24b placed at the right front of the vehicle 1 and a transparent cover 22b attached to the housing 24b. The lighting system 4c is provided at a left rear of the vehicle 1. In particular, the lighting system 4c includes a housing 24c placed at the left rear of the vehicle 1 and a transparent cover 22c attached to the housing 24c. The lighting system 4d is provided at a right rear of the vehicle 1. In particular, the lighting system 4d includes a housing 24d placed at the right rear of the vehicle 1 and a transparent cover 22d attached to the housing 24d.

Figure 2:
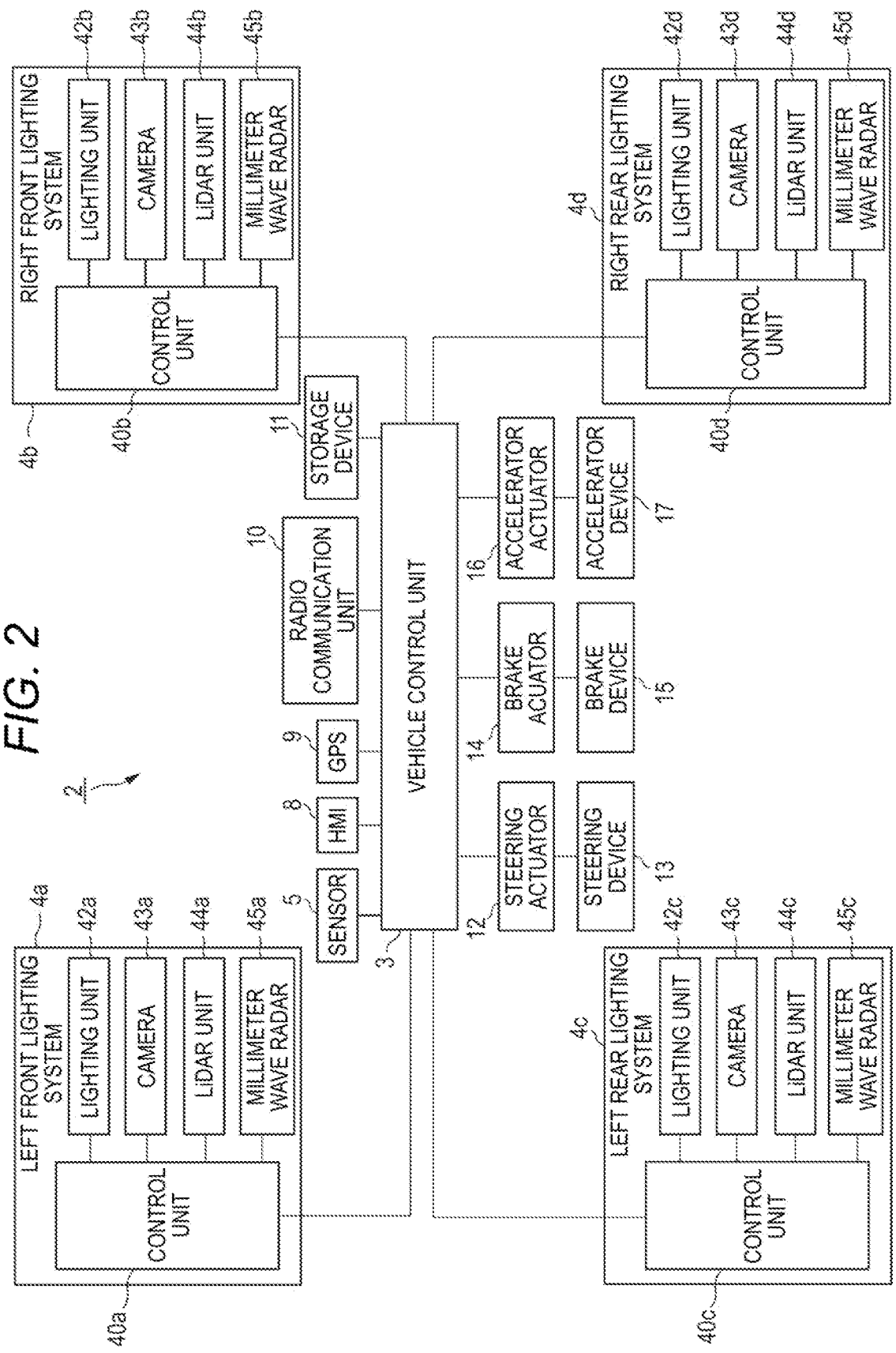
FIG. 2 is a block diagram showing the vehicle system according to the first embodiment.

Next, referring to FIG. 2, the vehicle system 2 shown in FIG. 1 will be described specifically. FIG. 2 is a block diagram showing the vehicle system 2 according to the present embodiment. As shown in FIG. 2, the vehicle system 2 includes the vehicle control unit 3, the lighting systems 4a to 4d, a sensor 5, a human machine interface (HMI) 8, a global positioning system (GPS) 9, a radio communication unit 10, and a storage device 11. Further, the vehicle system 2 includes a steering actuator 12, a steering device 13, a brake actuator 14, a brake device 15, an accelerator actuator 16, and an accelerator device 17. Furthermore, the vehicle system 2 includes a battery (not shown) configured to supply electric power.

The vehicle control unit 3 is configured to control the driving of the vehicle 1. The vehicle control unit 3 is made up, for example, of at least one electronic control unit (ECU). The electronic control unit may include at least one microcontroller including one or more processors and one or more memories and another electronic circuit including an active device and a passive device such as transistors. The processor is, for example, a central processing unit (CPU), a micro processing unit (MPU), a graphics processing unit (GPU) and/or a tensor processing unit (TPU). CPU may be made up of a plurality of CPU cores. GPU may be made up of a plurality of GPU cores. The memory includes a read only memory (ROM) and a random access memory (RAM). ROM may store a vehicle control program. For example, the vehicle control program may include an artificial intelligence (AI) program for autonomous driving. The AI program is a program fabricated by a machine learning with a teacher or without a teacher that uses a neural network such as deep learning or the like. RAM may temporarily store the vehicle control program, vehicle control data and/or surrounding environment information indicating a surrounding environment of the vehicle. The processor may be configured to deploy a program designated from the vehicle control program stored in ROM to execute various types of processing in cooperation with RAM on RAM.

The electronic control unit (ECU) may be configured by at least one integrated circuit such as an application specific integrated circuit (ASIC) or a field-programmable gate array (FPGA). Further, the electronic control unit may be made up of a combination of at least one microcontroller and at least one integrated circuit (FPGA or the like).

The lighting system 4a (an example of the sensing system) includes further a control unit 40a, a lighting unit 42a, a camera 43a, a light detection and ranging (LiDAR) unit 44a (an example of a laser radar), and a millimeter wave radar 45a. As shown in FIG. 1, the control unit 40a, the lighting unit 42a, the camera 43a, the LiDAR unit 44a, and the millimeter wave radar 45a are disposed in an interior of a space Sa defined by the housing 24a and the transparent cover 22a. The control unit 40a may be disposed in a predetermined place of the vehicle 1 other than the space Sa. For example, the control unit 40*a* may be configured integrally with the vehicle control unit 3.

The control unit 40*a* is made up, for example, of at least one electronic control unit (ECU). The electronic control unit may include at least one microcontroller including one or more processors and one or more memories and another electronic circuit (for example, a transistor or the like). The processor is, for example, CPU, MPU, GPU and/or TPU. CPU may be made up of a plurality of CPU cores. GPU may be made up of a plurality of GPU cores. The memory includes ROM and RAM. ROM may store a surrounding environment identifying program for identifying a surrounding environment of the vehicle 1. For example, the surrounding environment identifying program is a program configured by a machine learning with a teacher or without a teacher that uses a neural network such as deep learning or the like. RAM may temporarily store the surrounding environment identifying program, image data acquired by the camera 43*a*, three-dimensional mapping data (point group data) acquired by the LiDAR unit 44*a* and/or detection data acquired by the millimeter wave radar 45*a* and the like. The processor may be configured to deploy a program designated from the surrounding environment identifying program stored in ROM to execute various types of processing in cooperation with RAM on RAM. In addition, the electronic control unit (ECU) may be made up of at least one integrated circuit such as ASIC, FPGA, or the like. Further, the electronic control unit may be made up of a combination of at least one microcontroller and at least one integrated circuit (FPGA or the like).

The lighting unit 42*a* is configured to form a light distribution pattern by emitting light towards an exterior (a front) of the vehicle 1. The lighting unit 42*a* includes a light source for emitting light and an optical system. The light source may be made up, for example, of a plurality of light emitting devices that are arranged into a matrix configuration (for example, N rows×M columns, N>1, M>1). The light emitting device is, for example, a light emitting diode (LED), a laser diode (LD) or an organic EL device. The optical system may include at least one of a reflector configured to reflect light emitted from the light source towards the front of the lighting unit 42*a* and a lens configured to refract light emitted directly from the light source or light reflected by the reflector. In the case where the driving mode of the vehicle 1 is a manual driving mode or a driving assistance mode, the lighting unit 42*a* is configured to form a light distribution pattern for a driver (for example, a low beam light distribution pattern or a high beam light distribution pattern) ahead of the vehicle 1. In this way, the lighting unit 42*a* functions as a left headlamp unit. On the other hand, in the case where the driving mode of the vehicle 1 is a high-degree driving assistance mode or a complete autonomous driving mode, the lighting unit 42*a* may be configured to form a light distribution pattern for a camera ahead of the vehicle 1.

The control unit 40*a* may be configured to supply individually electric signals (for example, pulse width modulation (PWM) signals) to the plurality of light emitting devices provided on the lighting unit 42*a*. In this way, the control unit 40*a* can select individually and separately the light emitting devices to which the electric signals are supplied and control the duty ratio of the electric signal supplied to each of the light emitting devices. That is, the control unit 40*a* can select the light emitting devices to be turned on or turned off from the plurality of light emitting devices arranged into the matrix configuration and control the luminance of the light emitting diodes that are illuminated. As a result, the control unit 40*a* can change the shape and brightness of a light distribution pattern emitted towards the front of the lighting unit 42*a*.

The camera 43*a* is configured to detect a surrounding environment of the vehicle 1. In particular, the camera 43*a* is configured to acquire at first image data indicating a surrounding environment of the vehicle 1 and to then transmit the image data to the control unit 40*a*. The control unit 40*a* identifies a peripheral environment based on the transmitted image data. Here, the surrounding environment information may include information on a target object existing at an exterior of the vehicle 1. For example, the surrounding environment information may include information on an attribute of a target object existing at an exterior of the vehicle 1 and information on a distance and a position of the target object with respect to the vehicle 1. The camera 43*a* is made up, for example, of an imaging device such as a charge-coupled device (CCD), a metal oxide semiconductor (MOS), or the like. The camera 43*a* may be configured as a monocular camera or may be configured as a stereo camera. In the case that the camera 43*a* is a stereo camera, the control unit 40*a* can identify a distance between the vehicle 1 and a target object (for example, a pedestrian or the like) existing at an exterior of the vehicle 1 based on two or more image data acquired by the stereo camera by making use of a parallax. Additionally, in the present embodiment, although one camera 43*a* is provided in the lighting system 4*a*, two or more cameras 43*a* may be provided in the lighting system 4*a*.

The LiDAR unit 44*a* is configured to detect a surrounding environment of the vehicle 1. In particular, the LiDAR unit 44*a* is configured to acquire at first point group data (3D mapping data) indicating a surrounding environment of the vehicle 1 and to then transmit the point group data to the control unit 40*a*. The control unit 40*a* identifies surrounding environment information based on the point group data transmitted thereto. Here, the surrounding environment information may include information on a target object existing as an exterior of the vehicle 1. For example, the surrounding environment information may include information on an attribute of a target object existing at an exterior of the vehicle 1 and information on a distance and a position of the target object with respect to the vehicle 1 and information on a traveling direction of the target object.

More specifically, the LiDAR unit 44*a* can acquire at first information on a time of flight (TOF) $\Delta T1$ of a laser beam at each emission angle (a horizontal angle $\theta$, a vertical angle $\varphi$) of the laser beam and can then acquire information on a distance D between the LiDAR unit 44*a* (the vehicle 1) and an object existing at an exterior of the vehicle 1 at each emission angle (a horizontal angle $\theta$, a vertical angle $\varphi$) based on the information on the time of flight $\Delta T1$. Here, the time of flight $\Delta T1$ can be calculated as follows, for example.

Time of flight $\Delta T1$=a time $t1$ when a laser beam (a light pulse) returns to LiDAR unit−a time $t0$ when LiDAR unit emits the laser beam (the light pulse).

In this way, the LiDAR unit 44*a* can acquire the point group data (the 3D mapping data) indicating the surrounding environment of the vehicle 1.

Additionally, the LiDAR unit 44*a* includes, for example, a laser light source configured to emit a laser beam, an optical deflector configured to scan a laser beam in a horizontal direction and a vertical direction, an optical system such as a lens, and an acceptance module configured to accept or receive a laser beam reflected by an object. No specific limitation is imposed on a central wavelength of a laser beam emitted from the laser light source. For example, a laser beam may be invisible light whose central wavelength is near 900 nm. The optical deflector may be, for example, a micro electromechanical system (MEMS) mirror or a polygon mirror. The acceptance module may be, for example, a photodiode. The LiDAR unit 44a may acquire point group data without scanning the laser beam by the optical deflector. For example, the LiDAR unit 44a may acquire point group data by use of a phased array method or a flash method. In addition, in the present embodiment, although one LiDAR unit 44a is provided in the lighting system 4a, two or more LiDAR units 44a may be provided in the lighting system 4a. For example, when two LiDAR units 44a are provided in the lighting system 4a, one LiDAR unit 44a may be configured to detect a surrounding environment in a front area ahead of the vehicle 1, while the other LiDAR unit 44a may be configured to detect a surrounding environment in a side area to the vehicle 1.

Additionally, the LiDAR unit 44a may scan a laser beam at a predetermined angular pitch Δθ in a horizontal direction (a predetermined scanning resolution in the horizontal direction) and a predetermined angular pitch Δφ in an up-and-down direction (a predetermined scanning resolution in the up-and-down direction). As will be described later, the LiDAR unit 44a may increase an angular pitch (a scanning resolution) in a predetermined angular area where a target object exists. In the present embodiment, although it is premised that a "horizontal direction" and an "up-and-down direction" of the LiDAR unit 44a coincide with a "horizontal direction" and an "up-and-down direction" of the vehicle 1, they do not necessarily have to coincide with each other.

The millimeter wave radar 45a is configured to detect a surrounding environment of the vehicle 1. In particular, the millimeter wave radar 45a is configured to acquire at first detection data indicating a surrounding environment of the vehicle 1 and then transmit the detection data to the control unit 40a. The control unit 40a identifies surrounding environment information based on the transmitted detection data. Here, the surrounding environment information may include information on a target object existing at an exterior of the vehicle 1. The surrounding environment information may include, for example, information on an attribute of a target object existing at an exterior of the vehicle 1, information on a position of the target object with respect to the vehicle 1, and information on a speed of the target object with respect to the vehicle 1.

For example, the millimeter wave radar 45a can acquire a distance D between the millimeter wave radar 45a (the vehicle 1) and an object existing at an exterior of the vehicle 1 by use of a pulse modulation method, a frequency modulated-continuous wave (FM-CW) method or a dual frequency continuous wave (CW) method. In the case where the pulse modulation method is used, the millimeter wave radar 45a can acquire at first information on a time of flight ΔT2 of a millimeter wave at each emission angle of the millimeter wave and can then acquire information on a distance D between the millimeter wave radar 45a (the vehicle 1) and an object existing at an exterior of the vehicle 1 at each emission angle based on the information on the time of flight ΔT2. Here, the time of flight ΔT2 can be calculated, for example, as follows.

Time of flight ΔT2=a time t3 when a millimeter wave returns to the millimeter wave radar−a time t2 when the millimeter wave radar emits the millimeter wave Additionally, the millimeter wave radar 45a can acquire information on a relative velocity V of an object existing at an exterior of the vehicle 1 to the millimeter wave radar 45a (the vehicle 1) based on a frequency f0 of a millimeter wave emitted from the millimeter wave radar 45a and a frequency f1 of the millimeter wave that returns to the millimeter wave radar 45a.

Additionally, in the present embodiment, although one millimeter wave radar 45a is provided in the lighting system 4a, two or more millimeter wave radars 45a may be provided in the lighting system 4a. For example, the lighting system 4a may include a short-distance millimeter wave radar 45a, a middle-distance millimeter wave radar 45a, and a long-distance millimeter wave radar 45a.

The lighting system 4b further includes a control unit 40b, a lighting unit 42b, a camera 43b, a LiDAR unit 44b, and a millimeter wave radar 45b. As shown in FIG. 1, the control unit 40b, the lighting unit 42b, the camera 43b, the LiDAR unit 44b, and the millimeter wave radar 45b are disposed in an interior of a space Sb defined by the housing 24b and the transparent cover 22b. The control unit 40b may be disposed in a predetermined place on the vehicle 1 other than the space Sb. For example, the control unit 40b may be configured integrally with the vehicle control unit 3. The control unit 40b may have a similar function and configuration to those of the control unit 40a. The lighting unit 42b may have a similar function and configuration to those of the lighting unit 42a. In this respect, the lighting unit 42a functions as the left headlamp unit, while the lighting unit 42b functions as a right headlamp unit. The camera 43b may have a similar function and configuration to those of the camera 43a. The LiDAR unit 44b may have a similar function and configuration to those of the LiDAR unit 44a. The millimeter wave radar 45b may have a similar function and configuration to those of the millimeter wave radar 45a.

The lighting system 4c further includes a control unit 40c, a lighting unit 42c, a camera 43c, a LiDAR unit 44c, and a millimeter wave radar 45c. As shown in FIG. 1, the control unit 40c, the lighting unit 42c, the camera 43c, the LiDAR unit 44c, and the millimeter wave radar 45c are disposed in an interior of a space Sc defined by the housing 24c and the transparent cover 22c (an interior of a lamp compartment). The control unit 40c may be disposed in a predetermined place on the vehicle 1 other than the space Sc. For example, the control unit 40c may be configured integrally with the vehicle control unit 3. The control unit 40c may have a similar function and configuration to those of the control unit 40a.

The lighting unit 42c is configured to form a light distribution pattern by emitting light towards an exterior (a rear) of the vehicle 1. The lighting unit 42c includes a light source for emitting light and an optical system. The light source may be made up, for example, of a plurality of light emitting devices that are arranged into a matrix configuration (for example, N rows×M columns, N>1, M>1). The light emitting device is, for example, an LED, an LD or an organic EL device. The optical system may include at least one of a reflector configured to reflect light emitted from the light source towards the front of the lighting unit 42c and a lens configured to refract light emitted directly from the light source or light reflected by the reflector. In the case where the driving mode of the vehicle 1 is the manual driving mode or the driving assistance mode, the lighting unit 42c may be turned off. On the other hand, in the case where the driving mode of the vehicle 1 is the high-degree driving assistance mode or the complete autonomous driving mode, the lighting unit 42c may be configured to form a light distribution pattern for a camera behind the vehicle 1.

The camera 43c may have a similar function and configuration to those of the camera 43a. The LiDAR unit 44c may have a similar function and configuration to those of the LiDAR unit 44c. The millimeter wave radar 45c may have a similar function and configuration to those of the millimeter wave radar 45a.

The lighting system 4d includes further a control unit 40d, a lighting unit 42d, a camera 43d, a LiDAR unit 44d, and a millimeter wave radar 45d. As shown in FIG. 1, the control unit 40d, the lighting unit 42d, the camera 43d, the LiDAR unit 44d, and the millimeter wave radar 45d are disposed in an interior of a space Sd defined by the housing 24d and the transparent cover 22d (an interior of a lamp compartment). The control unit 40d may be disposed in a predetermined place on the vehicle 1 other than the space Sd. For example, the control unit 40d may be configured integrally with the vehicle control unit 3. The control unit 40d may have a similar function and configuration to those of the control unit 40c. The lighting unit 42d may have a similar function and configuration to those of the lighting unit 42c. The camera 43d may have a similar function and configuration to those of the camera 43c. The LiDAR unit 44d may have a similar function and configuration to those of the LiDAR unit 44c. The millimeter wave radar 45d may have a similar function and configuration to those of the millimeter wave radar 45c.

The sensor 5 may include an acceleration sensor, a speed sensor, a gyro sensor, and the like. The sensor 5 detects a driving state and outputs driving state information indicating such a driving state of the vehicle 1 to the vehicle control unit 3. The sensor 5 may further include a seating sensor configured to detect whether the driver is seated on a driver's seat, a face direction sensor configured to detect a direction in which the driver directs his or her face, an exterior weather sensor configured to detect an exterior weather state, a human or motion sensor configured to detect whether a human exists in an interior of a passenger compartment. Furthermore, the sensor 5 may include an illuminance sensor configured to detect a degree of brightness (an illuminance) of a surrounding environment of the vehicle 1. The illuminance sensor may determine a degree of brightness of a surrounding environment of the vehicle 1, for example, in accordance with a magnitude of optical current outputted from a photodiode.

The human machine interface (HMI) 8 may include an input module configured to receive an input operation from the driver and an output module configured to output the driving state information or the like towards the driver. The input module includes a steering wheel, an accelerator pedal, a brake pedal, a driving modes changeover switch configured to switch driving modes of the vehicle 1, and the like. The output module includes a display configured to display thereon driving state information, surrounding environment information and an illuminating state of the lighting system 4, and the like.

The global positioning system (GPS) 9 acquires information on a current position of the vehicle 1 and then outputs the current position information so acquired to the vehicle control unit 3.

The radio communication unit 10 receives information on other vehicles running or existing on the surroundings of the vehicle 1 (for example, other vehicles' running information) from the other vehicles and transmits information on the vehicle 1 (for example, subject vehicle's running information) to the other vehicles (a V2V communication). The radio communication unit 10 receives infrastructural information from infrastructural equipment such as a traffic signal controller, a traffic sign lamp or the like and transmits the subject vehicle's running information of the vehicle 1 to the infrastructural equipment (a V2I communication). In addition, the radio communication unit 10 receives information on a pedestrian from a mobile electronic device (a smartphone, an electronic tablet, an electronic wearable device, and the like) that the pedestrian carries and transmits the subject vehicle's running information of the vehicle 1 to the mobile electronic device (a V2P communication). The vehicle 1 may communicate directly with other vehicles, infrastructural equipment or a mobile electronic device in an ad hoc mode or may communicate with them via access points. Radio communication standards include, for example, Wi-Fi (a registered trademark), Bluetooth (a registered trademark), ZigBee (a registered trademark), and LPWA or Li-Fi. The vehicle 1 may communicate with other vehicles, infrastructural equipment or a mobile electronic device via a fifth generation (5G) mobile communication system.

The storage device 11 is an external storage device such as a hard disk drive (HDD) or a solid state drive (SSD). The storage device 11 may store two-dimensional or three-dimensional map information and/or a vehicle control program. For example, the 3D map information may be configured by point group data. The storage device 11 outputs map information or a vehicle control program to the vehicle control unit 3 in demand for the vehicle control unit 3. The map information and the vehicle control program may be updated via the radio communication unit 10 and a communication network such as the internet.

In the case where the vehicle 1 is driven in the autonomous driving mode, the vehicle control unit 3 generates at least one of a steering control signal, an accelerator control signal, and a brake control signal based on the driving state information, the surrounding environment information the current position information and/or the map information. The steering actuator 12 receives a steering control signal from the vehicle control unit 3 and controls the steering device 13 based on the steering control signal so received. The brake actuator 14 receives a brake control signal from the vehicle control unit 3 and controls the brake device 15 based on the brake control signal so received. The accelerator actuator 16 receives an accelerator control signal from the vehicle control unit 3 and controls the accelerator device 17 based on the accelerator control signal so received. In this way, in the autonomous driving mode, the driving of the vehicle 1 is automatically controlled by the vehicle system 2.

On the other hand, in the case where the vehicle 1 is driven in the manual driving mode, the vehicle control unit 3 generates a steering control signal, an accelerator control signal, and a brake control signal as the driver manually operates the accelerator pedal, the brake pedal, and the steering wheel. In this way, in the manual driving mode, since the steering control signal, the accelerator control signal, and the brake control are generated as the driver manually operates the accelerator pedal, the brake pedal, and the steering wheel, the driving of the vehicle 1 is controlled by the driver.

Next, the driving modes of the vehicle 1 will be described. The driving modes include the autonomous driving mode and the manual driving mode. The autonomous driving mode includes a complete autonomous driving mode, a high-degree driving assistance mode, and a driving assistance mode. In the complete autonomous driving mode, the vehicle system 2 automatically performs all the driving controls of the vehicle 1 including the steering control, the brake control, and the accelerator control, and the driver stays in a state where the driver cannot drive or control the vehicle 1 as he or she wishes. In the high-degree driving assistance mode, the vehicle system 2 automatically performs all the driving controls of the vehicle 1 including the steering control, the brake control, and the accelerator control, and although the driver stays in a state where the driver can drive or control the vehicle 1, the driver does not drive the vehicle 1. In the driving assistance mode, the vehicle system 2 automatically performs a partial driving control of the steering control, the brake control, and the accelerator control, and the driver drives the vehicle 1 with assistance of the vehicle system 2 in driving. On the other hand, in the manual driving mode, the vehicle system 2 does not perform the driving control automatically, and the driver drives the vehicle 1 without any assistance of the vehicle system 2 in driving.

In addition, the driving modes of the vehicle 1 may be switched over by operating a driving modes changeover switch. In this case, the vehicle control unit 3 switches over the driving modes of the vehicle 1 among the four driving modes (the complete autonomous driving mode, the high-degree driving assistance mode, the driving assistance mode, the manual driving mode) in response to an operation performed on the driving modes changeover switch by the driver. The driving modes of the vehicle 1 may automatically be switched over based on information on an autonomous driving permitting section where the autonomous driving of the vehicle 1 is permitted and an autonomous driving prohibiting section where the autonomous driving of the vehicle 1 is prohibited, or information on an exterior weather state. In this case, the vehicle control unit 3 switches over the driving modes of the vehicle 1 based on those pieces of information. Further, the driving modes of the vehicle 1 may automatically be switched over by use of the seating sensor or the face direction sensor. In this case, the vehicle control unit 3 may switch over the driving modes of the vehicle 1 based on an output signal from the seating sensor or the face direction sensor.

Figure 3:
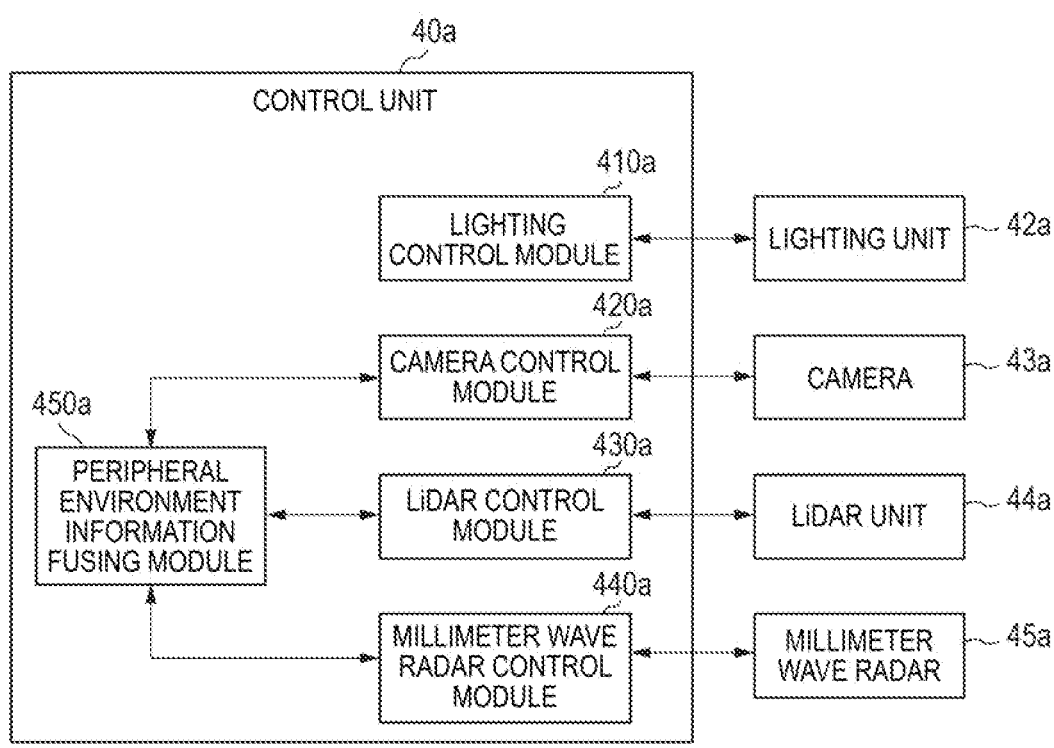
FIG. 3 is a functional block diagram of a control unit for a left front lighting system.

Next, referring to FIG. 3, the function of the control unit 40*a* will be described. FIG. 3 is a drawing showing functional blocks of the control unit 40*a* of the lighting system 4*a*. As shown in FIG. 3, the control unit 40*a* is configured to control individual operations of the lighting unit 42*a*, the camera 43*a*, the LiDAR unit 44*a*, and the millimeter wave radar 45*a*. In particular, the control unit 40*a* includes a lighting control module 410*a*, a camera control module 420*a*, a LiDAR control module 430*a*, a millimeter wave control module 440*a*, and a surrounding environment information fusing module 450*a*.

The lighting control module 410*a* is configured to cause the lighting unit 42*a* to emit a predetermined light distribution pattern towards a front area ahead of the vehicle 1 For example, the lighting control module 410*a* may change the light distribution pattern that is emitted from the lighting unit 42*a* in accordance with the driving mode of the vehicle 1.

The camera control module 420*a* is configured not only to control the operation of the camera 43*a* but also to generate surrounding environment information of the vehicle 1 in a detection area $S_1$ (refer to FIG. 4) of the camera 43*a* (hereinafter, referred to as surrounding environment information I1) based on image data outputted from the camera 43*a*. The LiDAR control module 430*a* is configured not only to control the operation of the LiDAR unit 44*a* but also to generate surrounding environment information of the vehicle 1 in a detection area S2 (refer to FIG. 4) of the LiDAR unit 44*a* (hereinafter, referred to as surrounding environment information I2) based on point group data outputted from the LiDAR unit 44*a*. The millimeter wave radar control module 440*a* is configured not only to control the operation of the millimeter wave radar 45*a* but also to generate surrounding environment information of the vehicle 1 in a detection area S3 (refer to FIG. 4) of the millimeter wave radar 45*a* (hereinafter, referred to as surrounding environment information I3) based on detection data outputted from the millimeter wave radar 45*a*.

Figure 4:
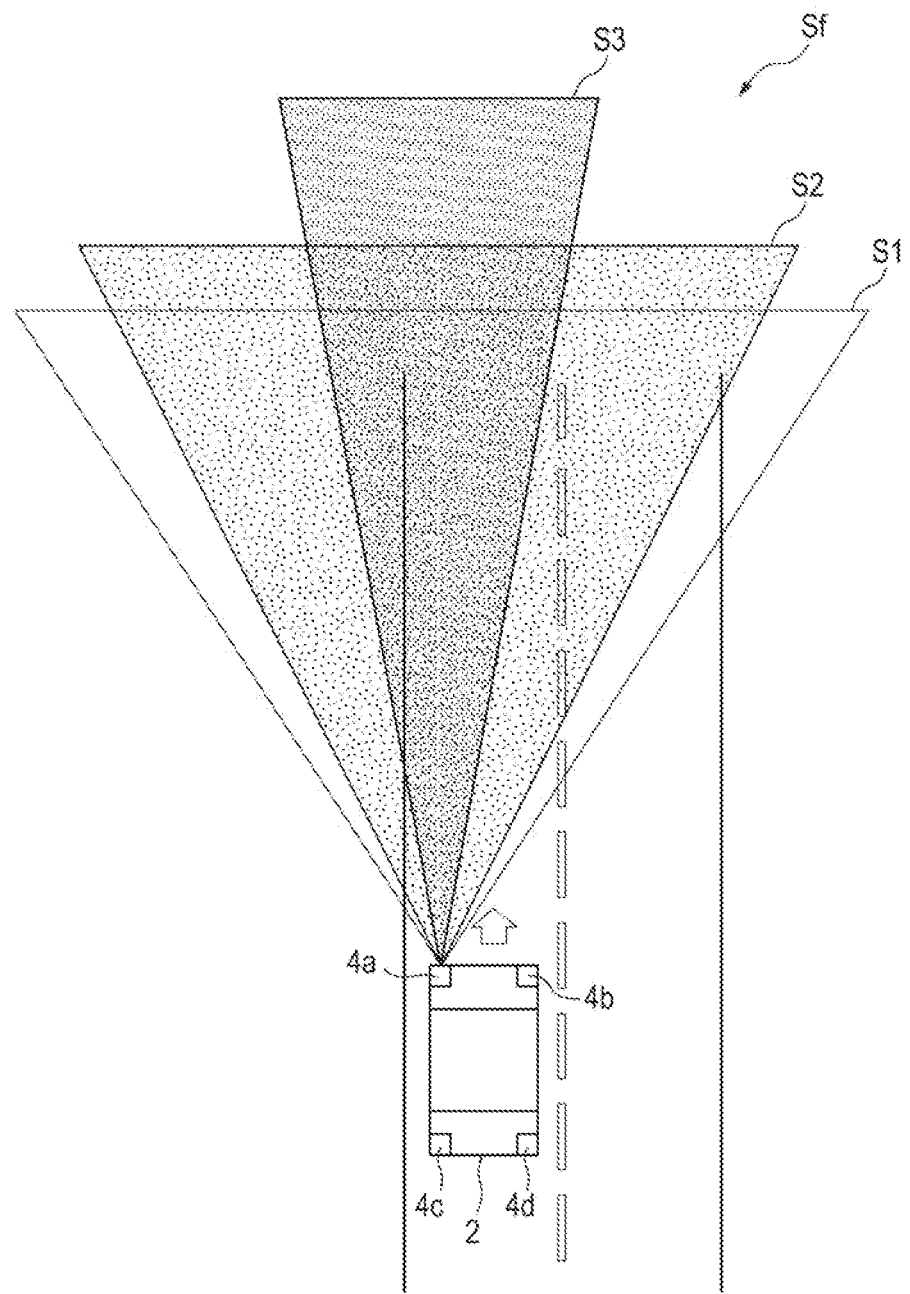
FIG. 4 is a diagram illustrating a detection area by a camera, a detection area by a LiDAR unit, and a detection area by a millimeter wave radar of the left front lighting system.

The surrounding environment information fusing module 450*a* is configured to fuse the pieces of peripheral environment information I1, I2, I3 together so as to generate fused surrounding environment information If. Here, the surrounding environment information If may include information on a target object existing at an exterior of the vehicle 1 in a detection area Sf that is a combination of the detection area S1 of the camera 43*a*, the detection area S2 of the LiDAR unit 44*a*, and the detection area S3 of the millimeter wave radar 45*a* as shown in FIG. 4. For example, the surrounding environment information If may include information on an attribute of a target object, a position of the target object with respect to the vehicle 1, a distance between the vehicle 1 and the target object, a velocity of the target object with respect to the vehicle 1, and/or a traveling direction of the target object. The surrounding environment information fusing module 450*a* transmits the surrounding environment information If to the vehicle control unit 3.

Figure 5:
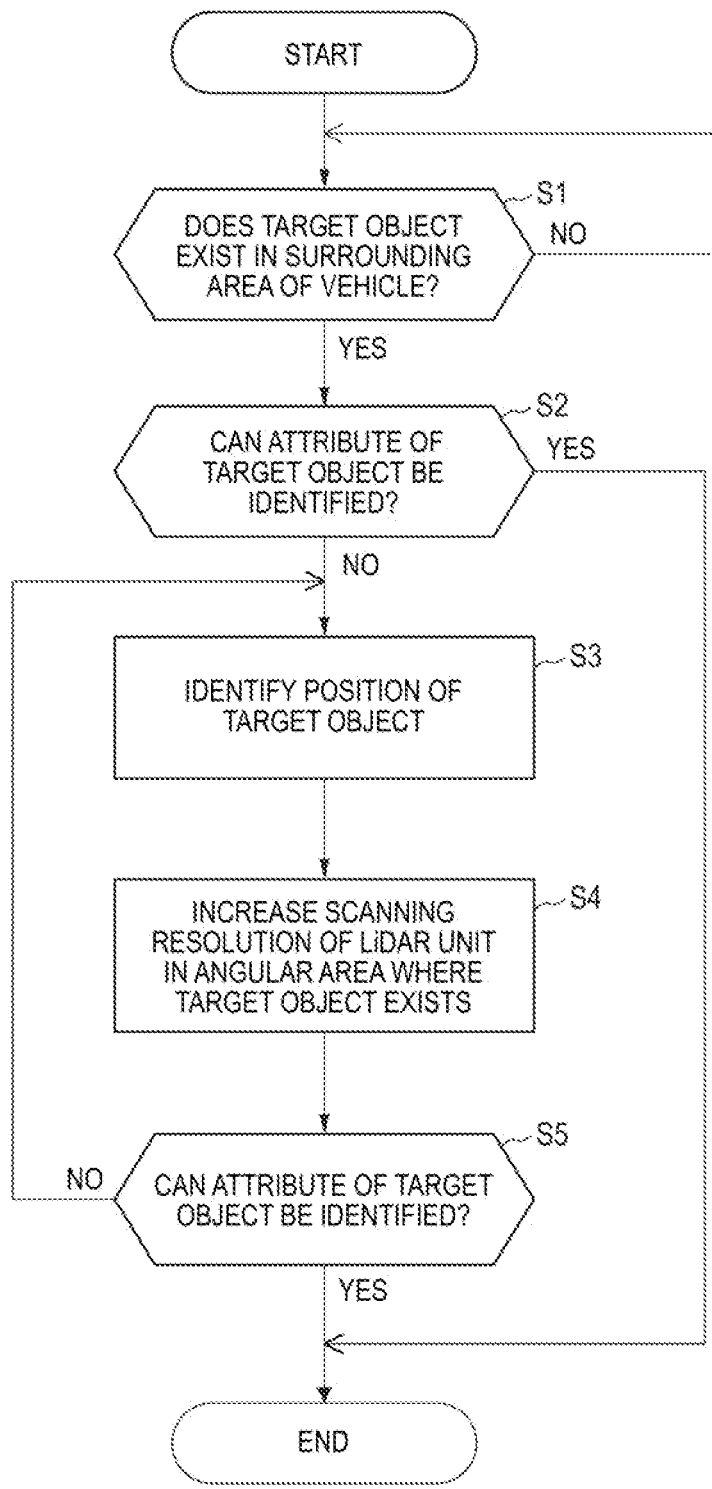
FIG. 5 is a flow chart for explaining a control method of the LiDAR unit according to the first embodiment.
Figure 6:
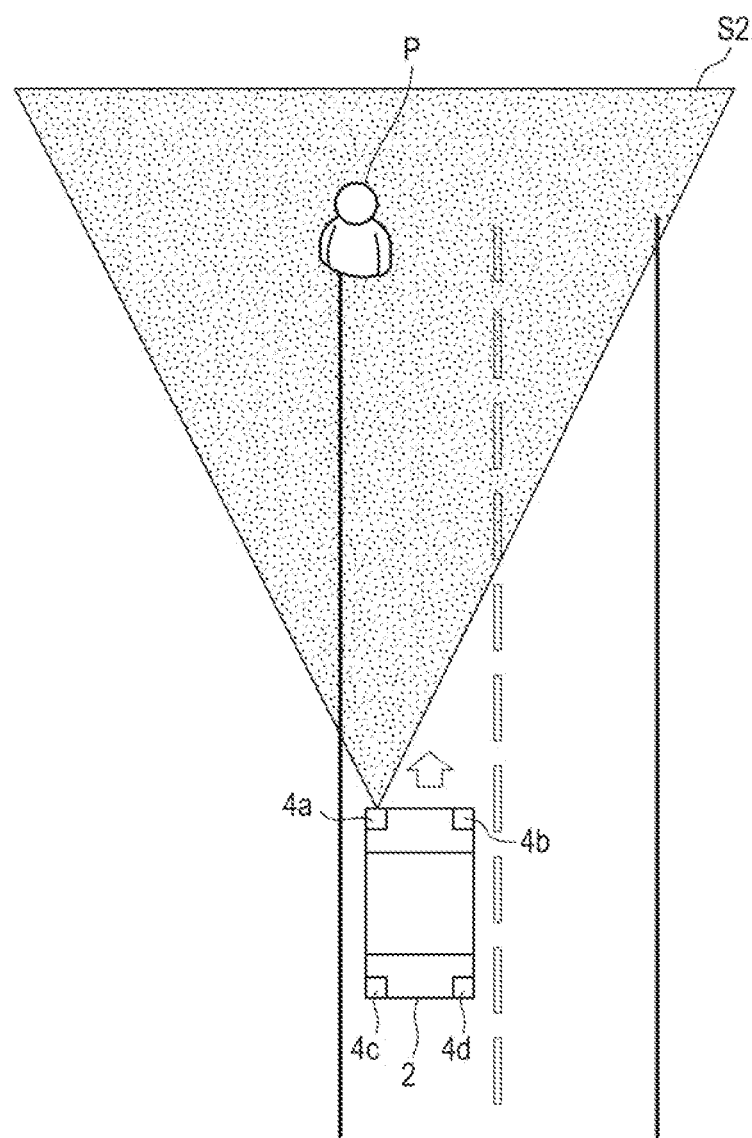
FIG. 6 is a drawing showing a state in which a pedestrian exists in the detection area of the LiDAR unit.
Figure 7:
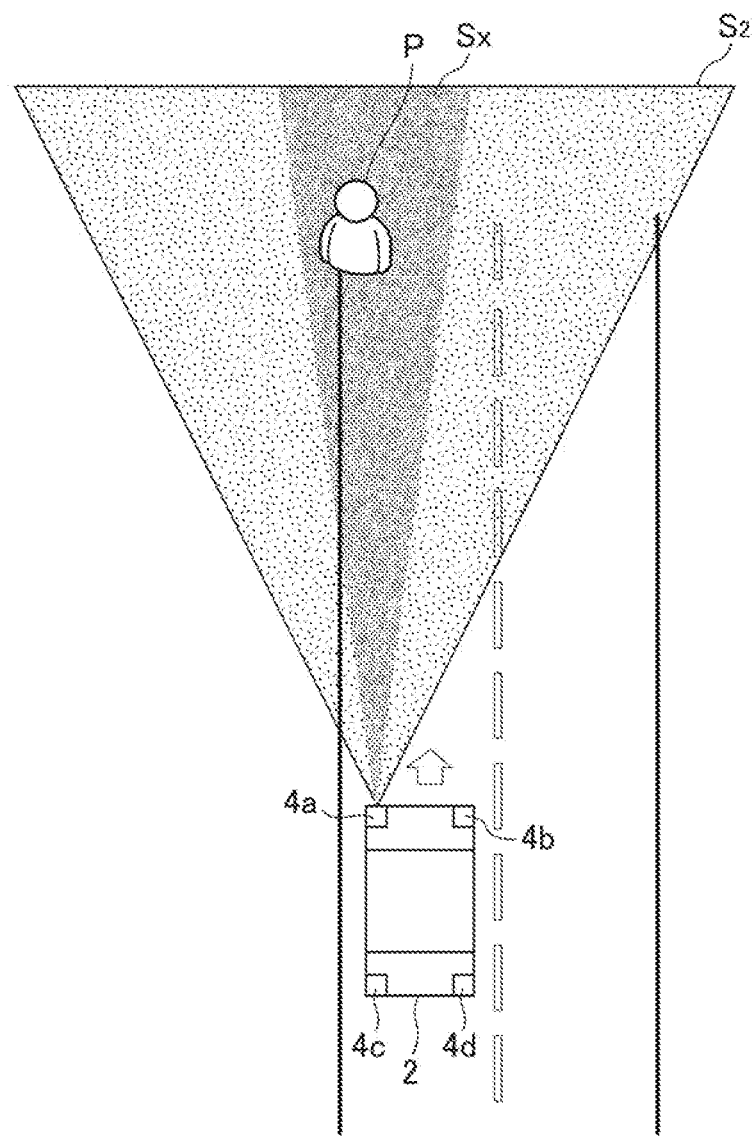
FIG. 7 is a drawing showing an angular area where the pedestrian exists.

Next, referring to FIGS. 5 to 7, a control method of the LiDAR unit 44*a* according to the embodiment (that is, a process of increasing a scanning resolution of the LiDAR unit 44*a*) will be described. FIG. 5 is a flow chart for explaining a control method of the LiDAR unit 44*a* according to the embodiment. FIG. 6 is a drawing showing a state in which a pedestrian P (an example of a target object) exists in the detection area S2 of the LiDAR unit 44*a*. FIG. 7 is a drawing showing an angular area Sx where the pedestrian P exists. In FIGS. 6 and 7, as a matter of convenience in description, the detection areas of the sensors other than the LiDAR unit 44*a* are omitted from illustration. In this embodiment, although only the control method of the LiDAR unit 44*a* will be described, the control method of the LiDAR unit 44*a* can also be applied to the LiDAR units 44*b* to 44*d*. That is, the control units 40*b* to 40*d* may control the corresponding LiDAR units 44*b* to 44*d* using similar control methods to the control method of the LiDAR unit 44*a*.

As shown in FIG. 5, in step S1, the LiDAR control module 430*a* determines whether a target object (for example, a pedestrian or another vehicle) exists in a surrounding area of the vehicle 1 (specifically, the detection area S2 of the LiDAR unit 44*a*) based on point group data acquired from the LiDAR unit 44*a*. The LiDAR unit 44*a* scans a laser beam at a predetermined angular pitch $\Delta\theta$ in the horizontal direction of the vehicle 1 and at a predetermined angular pitch $\Delta\varphi$ in the up-and-down direction of the vehicle 1. In this way, the LiDAR unit 44*a* can generate point group data by scanning the laser beam at the predetermined angular pitches $\Delta\theta$, $\Delta\varphi$. The smaller the predetermined angular pitches, the higher the space resolution of the point group data.

If the result of the determination made in step S1 is YES, the LiDAR control module 430*a* executes an operation in step S2. On the other hand, if the result of the determination in step S1 is NO, the LiDAR control module 430*a* waits until the result of the determination in step S1 becomes YES. In place of the LiDAR control module 430a, the vehicle control unit 3 may determine whether a target object exists in the surrounding area of the vehicle 1 based on the surrounding environment information If transmitted from the control unit 40a.

Next, in step S2, the LiDAR control module 430a determines whether the attribute of the target object existing in the surrounding area of the vehicle 1 can be identified based on the point group data. For example, when the target object is a pedestrian (or a bicycle), the attribute of the target object becomes a pedestrian (or a bicycle). In addition, when the target object is another vehicle, the attribute of the target object becomes a vehicle. In the present embodiment, as shown in FIG. 6, since the pedestrian P exists within the detection area S2 of the LiDAR unit 44a, the attribute of the target object becomes a pedestrian. If the result of the determination in step S2 is YES, a series of operations shown in FIG. 5 ends. On the other hand, if it determines that the attribute of the target object cannot be identified (NO in step S2), the LiDAR control module 430a executes an operation in step S3. In place of the LiDAR control module 430a, the vehicle control unit 3 may determine whether the attribute of the target object can be identified based on the surrounding environment information If.

Next, the LiDAR control module 430a identifies a position of the pedestrian P (the target object) based on the point group data (step S3). Here, the position of the pedestrian P may be a relative position (coordinates) of the pedestrian P with respect to the vehicle 1 or may be a position (coordinates) of the pedestrian P in a global space. Additionally or alternatively to the information on the position of the pedestrian P, the LiDAR control module 430a may identify information on a distance between the vehicle 1 and the pedestrian P and information on an angle of the pedestrian P with respect to the vehicle 1. Further, in place of the LiDAR control module 430a, the vehicle control unit 3 may identify the position of the pedestrian P based on the surrounding environment information If.

Next, in step S4, the LiDAR control module 430a increases the scanning resolution of the LiDAR unit 44a only in an angular area Sx (refer to FIG. 7) where the pedestrian P (the target object) exists. Specifically, at first, the LiDAR control module 430a determines an angular area Sx (an example of a first angular area) based on the information on the position of the pedestrian P. The angular area Sx is an angular area that covers the whole of the pedestrian P For example, when an angular range of an area occupied by the pedestrian P is $\Delta\theta1$ in the horizontal direction of the vehicle 1, an angular range of the angular area Sx becomes $\Delta(\theta1+\alpha)$ ($\alpha>0$) in the horizontal direction of the vehicle 1. An angle $\Delta\alpha$ may be, for example, $0<\Delta\alpha<\Delta\theta1$. In this case, the angular range of the angular area Sx becomes greater than $\Delta\theta$ and smaller than $2\Delta\theta$.

Next, the LiDAR control module 430a controls the LiDAR unit 44a so that the scanning resolution of the LiDAR unit 44a in the angular area Sx is increased. For example, when the angular pitch $\Delta\theta$ in the horizontal direction within the detection area S2 is 0.5 degree, the LiDAR control module 430a may control the LiDAR unit 44a so that the angular pitch $\Delta\theta$ in the horizontal direction within the angular area Sx becomes 0.1 degree. In this way, the LiDAR control module 430a can increase the scanning resolution in the horizontal direction of the LiDAR unit 44a in the angular area Sx. In addition, the LiDAR control module 430a may increase the scanning resolution in the up-and-down direction of the LiDAR unit 44a in the angular area Sx. For example, when the angular pitch $\Delta\varphi$ in the up-and-down direction within the detection area S2 is 3 degrees, the LiDAR control module 430a may control the LiDAR unit 44a so that the angular pitch in the up-and-down direction within the angular area Sx becomes 1 degree. In this way, the LiDAR control module 430a can increase the scanning resolution in the up-and-down direction in the angular area Sx.

Thereafter, with the scanning resolution of the LiDAR unit 44a only in the angular area Sx increased, the LiDAR unit 44a newly acquires point group data (the next frame of the point group data) indicating a surrounding environment of the vehicle 1. Here, in the point group data newly acquired by the LiDAR unit 44a (the next frame of the point group data), the space resolution in the angular area Sx is higher than space resolutions in other areas than the angular area Sx in the detection area S2. Because of this, information on the target object (the pedestrian P) existing in the angular area Sx (in particular, attribute information) can be acquired with high accuracy.

Next, the LiDAR control module 430a determines whether the attribute of the target object can be identified based on the point group data newly acquired from the LiDAR unit 44a (step S5). If the LiDAR control module 430a can identify the attribute of the target object based on the point group data (that is, if the LiDAR control module 430a determines that it can identify the attribute of the target object), the series of operations shown in FIG. 5 ends. On the other hand, if the LiDAR control module 430a cannot identify the attribute of the target object based on the point group data (that is, if the LiDAR control module 430a determines that it cannot identify the attribute of the target object), the operations in steps S3, S4 are executed again.

Specifically, in step S3, the LiDAR control module 430a updates the position of the pedestrian P (the target object) based on the point group data newly acquired from the LiDAR unit 44a. Thereafter, the LiDAR control module 430a at first updates the angular area Sx based on the updated information on the position of the pedestrian P and then increases further the scanning resolution of the LiDAR unit 44a only in the angular area Sx.

For example, when the angular pitch $\Delta\theta$ in the horizontal direction in the angular area Sx at the current point in time is 0.1 degree, the LiDAR control module 430a may control the LiDAR unit 44a such that the angular pitch $\Delta\theta$ in the horizontal direction in the angular area Sx becomes 0.05 degree. In this way, the LiDAR control module 430a can gradually increase the scanning resolution in the horizontal direction of the LiDAR unit 44a. Further, the LiDAR control module 430a may gradually increase the scanning resolution in the up-and-down direction of the LiDAR unit 44a. Thereafter, with the scanning resolution of the LiDAR unit 44a in the angular area Sx increased further by the LiDAR control module 430a, the LiDAR unit 44a newly acquires point group data indicating a surrounding environment of the vehicle 1. Thereafter, the LiDAR control module 430a determines whether the attribute of the target object can be identified based on the point group data newly acquired. If the result of the determination in step S5 is NO, the operations in steps S3, S4 are executed again.

Thus, according to the present embodiment, in the detection area S2 of the LiDAR unit 44a, the scanning resolution of the LiDAR unit 44a in the angular area Sx where the pedestrian P exists is increased. Because of this, by increasing the scanning resolution of the LiDAR unit 44a in the angular area Sx while preventing the scanning resolutions in the other areas than the angular area Sx in the detection area S2 from being increased, the accuracy of the information on the pedestrian P can be improved while suppressing the operation load of the LiDAR control module 430a (ECU). Consequently, the lighting system 4a can be provided in which the accuracy of the surrounding environment information can be improved while suppressing the operation load of the LiDAR control module 430a.

If the LiDAR control module 430a cannot identify the attribute of the target object based on the point group data acquired from the LiDAR unit 44a (NO in step S2), the LiDAR control module 430a controls the LiDAR unit 44a so that the scanning resolution of the LiDAR unit 44a in the angular area Sx is increased. In particular, the LiDAR control module 430a controls the LiDAR unit 44a so that the scanning resolution of the LiDAR unit 44a in the angular area Sx is gradually increased until the LiDAR control module 430a can identify the attribute of the target object (until the result of the determination in step S5 becomes YES). In this way, since the angular area Sx where the pedestrian P exists is gradually increased, the attribute of the target object can be identified in an ensured fashion.

Additionally, the position of the pedestrian P is at first updated based on the point group data newly acquired from the LiDAR unit 44a, and then, the angular area Sx is updated based on the updated position of the pedestrian P. In this way, even when the pedestrian P is moving, the scanning resolution of the LiDAR unit 44a in the angular area Sx where the moving pedestrian P exists can be increased.

In the present embodiment, as a matter of convenience in description, although the pedestrian P is described as the example of the target object, the target object may be another vehicle (including a motorcycle and a tricycle), traffic infrastructure equipment, an obstacle, or the like. In the case that a plurality of target objects exist within the detection area S2 of the LiDAR unit 44a, a plurality of angular areas Sx, each of which is configured to cover at least one of the plurality of target objects, may be provided within the detection area S2. In this case, the LiDAR control module 430a may increase the scanning resolution of the LiDAR unit 44a in each of the plurality of angular areas Sx.

Second Embodiment

Hereinafter, referring to drawings, a second embodiment of the present disclosure will be described. A description of members having like reference numerals to those of the members that have already been described in the first embodiment will be omitted as a matter of convenience in description. Additionally, dimensions of members shown in the drawings may differ from time to time from actual dimensions of the members as a matter of convenience in description.

In description of the present embodiment, as a matter of convenience in description, a "left-and-right direction", a "front-and-rear direction", and an "up-and-down direction" will be referred to as required. These directions are relative directions set for a vehicle 101 shown in FIG. 8. Here, the "front-and rear direction" is a direction including a "front direction" and a "rear direction". The "left-and-right" direction is a direction including a "left direction" and a "right direction". The "up-and-down direction" is a direction including an "up direction" and a "down direction". In addition, a "horizontal direction" will also be described, and the "horizontal direction" is a direction perpendicular to the "up-and-down direction" and includes the "left-and-right direction" and the "front-and-rear direction.

Figure 8:
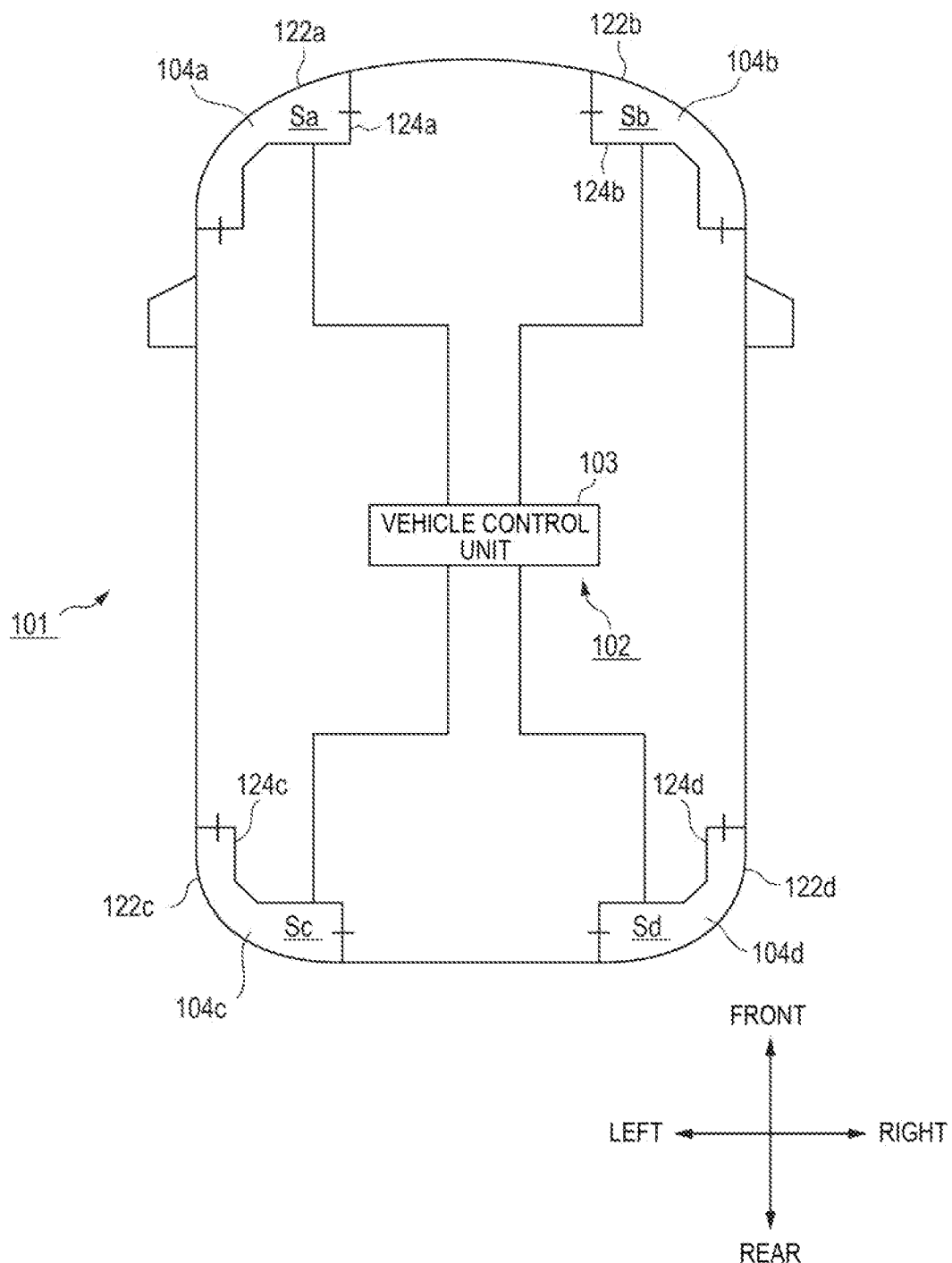
FIG. 8 is a top view of a vehicle including a vehicle system according to a second embodiment of the present invention.

Firstly, referring to FIG. 8, the vehicle 101 according to the present embodiment will be described. FIG. 8 is a schematic drawing showing a top view of the vehicle 101 including a vehicle system 102. As shown in FIG. 8, the vehicle 101 is a vehicle (a motor vehicle) that can run in an autonomous driving mode and includes the vehicle system 102. The vehicle system 102 includes at least a vehicle control unit 103, a left front lighting system 104a (hereinafter, referred to simply as a "lighting system 104a"), a right front lighting system 104b (hereinafter, referred to simply as a "lighting system 104b"), a left rear lighting system 104c (hereinafter, referred to simply as a "lighting system 104c"), and a right rear lighting system 104d (hereinafter, referred to simply as a "lighting system 104d").

The lighting system 104a is provided at a left front of the vehicle 101. In particular, the lighting system 104a includes a housing 124a placed at the left front of the vehicle 101 and a transparent cover 122a attached to the housing 124a. The lighting system 104b is provided at a right front of the vehicle 101. In particular, the lighting system 104b includes a housing 124b placed at the right front of the vehicle 101 and a transparent cover 122b attached to the housing 124b. The lighting system 104c is provided at a left rear of the vehicle 101. In particular, the lighting system 104c includes a housing 124c placed at the left rear of the vehicle 101 and a transparent cover 122c attached to the housing 124c. The lighting system 104d is provided at a right rear of the vehicle 101. In particular, the lighting system 104d includes a housing 124d placed at the right rear of the vehicle 101 and a transparent cover 122d attached to the housing 124d.

Figure 9:
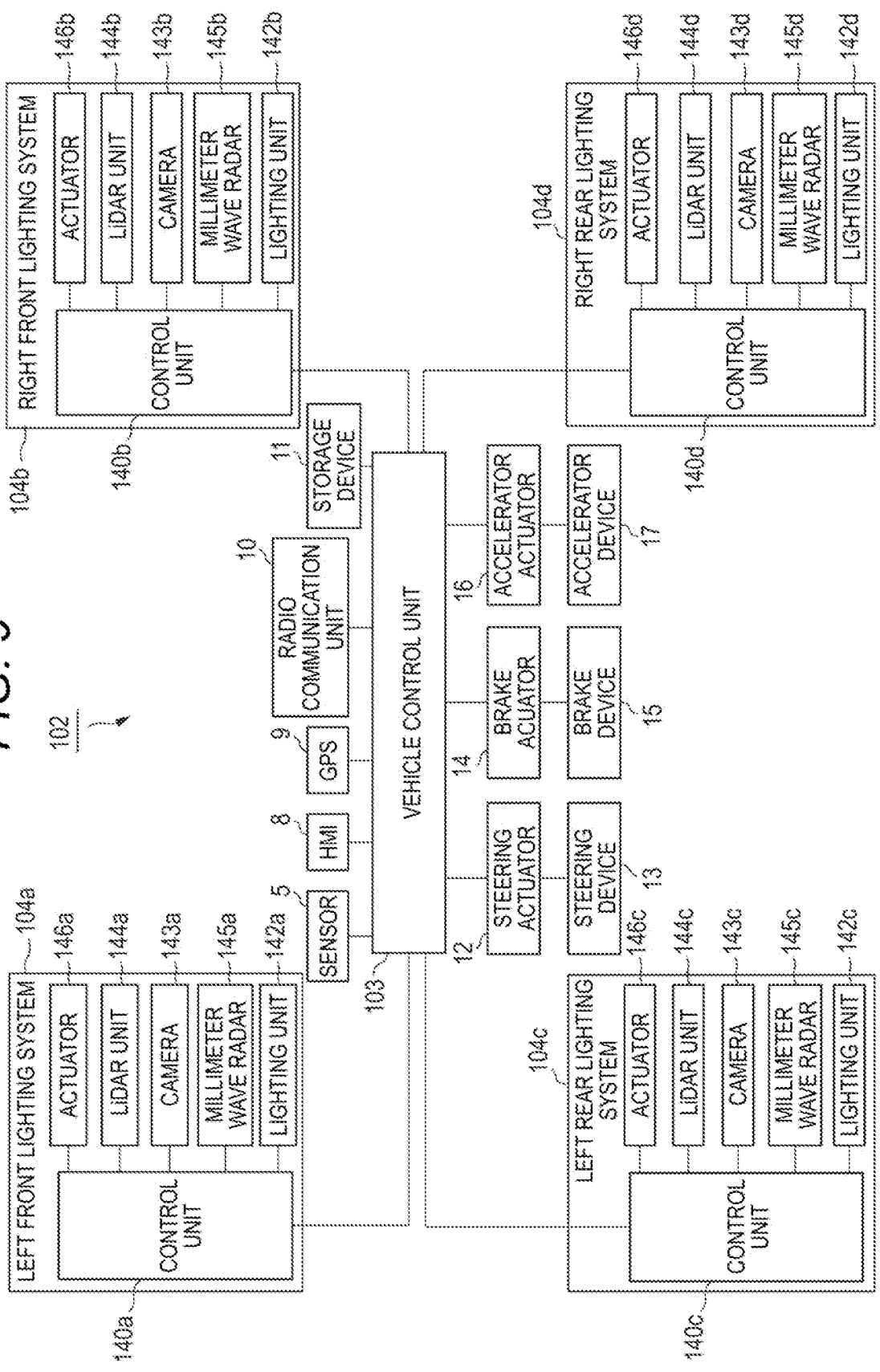
FIG. 9 is a block diagram showing the vehicle system according to the second embodiment.

Next, referring to FIG. 9, the vehicle system 102 shown in FIG. 8 will be described specifically. FIG. 9 is a block diagram showing the vehicle system 102 according to the present embodiment. As shown in FIG. 9, the vehicle system 102 includes the vehicle control unit 103, the lighting systems 104a to 104d, a sensor 5, a human machine interface (HMI) 8, a global positioning system (GPS) 9, a radio communication unit 10, and a storage device 11. Further, the vehicle system 102 includes a steering actuator 12, a steering device 13, a brake actuator 14, a brake device 15, an accelerator actuator 16, and an accelerator device 17. Furthermore, the vehicle system 102 includes a battery (not shown) configured to supply electric power.

The vehicle control unit 103 is configured to control the driving of the vehicle 101. The vehicle control unit 103 is made up, for example, of at least one electronic control unit (ECU). The electronic control unit may include at least one microcontroller including one or more processors and one or more memories and another electronic circuit including an active device and a passive device such as transistors. The processor is, for example, CPU, MPU, GPU and/or TPU. CPU may be made up of a plurality of CPU cores. GPU may be made up of a plurality of GPU cores. The memory includes ROM and RAM. ROM may store a vehicle control program. For example, the vehicle control program may include an artificial intelligence (AI) program for autonomous driving. The AI program is a program configured by a machine learning with a teacher or without a teacher that uses a neural network such as deep learning or the like. RAM may temporarily store the vehicle control program, vehicle control data and/or surrounding environment information indicating a surrounding environment of the vehicle. The processor may be configured to deploy a program designated from the vehicle control program stored in ROM to execute various types of processing in cooperation with RAM on RAM.

In addition, the electronic control unit (ECU) may be made up of at least one integrated circuit such as ASIC, FPGA, or the like. Further, the electronic control unit may be made up of a combination of at least one microcontroller and at least one integrated circuit (FPGA or the like).

The lighting system 104a (an example of a sensing system) further includes a control unit 140a, a lighting unit 142a, a camera 143a, a LiDAR unit 144a (an example of a laser radar), a millimeter wave radar 145a, and an actuator 146a. As shown in FIG. 8, the control unit 140a, the lighting unit 142a, the camera 143a, the LiDAR unit 144a, the millimeter wave radar 145a, and the actuator 146a are disposed in an interior of a space Sa defined by the housing 124a and the transparent cover 122a. The control unit 140a may be disposed in a predetermined place of the vehicle 101 other than the space Sa. For example, the control unit 140a may be configured integrally with the vehicle control unit 103.

The control unit 140a is made up, for example, of at least one electronic control unit (ECU). The electronic control unit may include at least one microcontroller including one or more processors and one or more memories and another electronic circuit (for example, a transistor or the like). The processor is, for example, CPU, MPU, GPU and/or TPU. CPU may be made up of a plurality of CPU cores. GPU may be made up of a plurality of GPU cores. The memory includes ROM and RAM. ROM may store a surrounding environment identifying program for identifying a surrounding environment of the vehicle 101. For example, the surrounding environment identifying program is a program configured by a machine learning with a teacher or without a teacher that uses a neural network such as deep learning or the like. RAM may temporarily store the surrounding environment identifying program, image data acquired by the camera 143a, three-dimensional mapping data (point group data) acquired by the LiDAR unit 144a and/or detection data acquired by the millimeter wave radar 145a, and the like. The processor may be configured to deploy a program designated from the surrounding environment identifying program stored in ROM to execute various types of processing in cooperation with RAM on RAM. In addition, the electronic control unit (ECU) may be made up of at least one integrated circuit such as ASIC, FPGA, or the like. Further, the electronic control unit may be made up of a combination of at least one microcontroller and at least one integrated circuit (FPGA or the like).

The lighting unit 142a is configured to form a light distribution pattern by emitting light towards an exterior (a front) of the vehicle 101. The lighting unit 142a includes a light source for emitting light and an optical system. The light source may be made up, for example, of a plurality of light emitting devices that are arranged into a matrix configuration (for example, N rows×M columns, N>1, M>1). The light emitting device is, for example, an LED, an LD or an organic EL device. The optical system may include at least one of a reflector configured to reflect light emitted from the light source towards the front of the lighting unit 142a and a lens configured to refract light emitted directly from the light source or light reflected by the reflector. In the case that the driving mode of the vehicle 101 is a manual driving mode or a driving assistance mode, the lighting unit 142a is configured to form a light distribution pattern for a driver (for example, a low beam light distribution pattern or a high beam light distribution pattern) ahead of the vehicle 101. In this way, the lighting unit 142a functions as a left headlamp unit. On the other hand, in the case where the driving mode of the vehicle 101 is a high-degree driving assistance mode or a complete autonomous driving mode, the lighting unit 142a may be configured to form a light distribution pattern for a camera ahead of the vehicle 101.

The control unit 140a may be configured to supply individually electric signals (for example, PWM signals) to a plurality of light emitting devices provided to the lighting unit 142a. In this way, the control unit 140a can select individually and separately the light emitting devices to which the electric signals are supplied and control the duty ratio of the electric signal supplied to each of the light emitting devices. That is, the control unit 140a can select the light emitting devices to be turned on or turned off from the plurality of light emitting devices arranged into the matrix configuration and control the luminance of the light emitting devices that are illuminated. As a result, the control unit 140a can change the shape and brightness of a light distribution pattern emitted forwards from the lighting unit 142a.

The camera 143a is configured to detect a surrounding environment of the vehicle 101. In particular, the camera 143a is configured to acquire at first image data indicating a surrounding environment of the vehicle 101 and to then transmit the image data to the control unit 140a. The control unit 140a identifies a surrounding environment based on the transmitted image data. Here, the surrounding environment information may include information on a target object existing at an exterior of the vehicle 101. For example, the surrounding environment information may include information on an attribute of a target object existing at an exterior of the vehicle 101 and information on a distance and a position of the target object with respect to the vehicle 101. The camera 143a is made up of an imaging device including, for example, CCD, CMOS or the like. The camera 143a may be configured as a monocular camera or may be configured as a stereo camera. In the case that the camera 143a is a stereo camera, the control unit 140a can identify a distance between the vehicle 101 and a target object (for example, a pedestrian or the like) existing at an exterior of the vehicle 101 based on two or more image data acquired by the stereo camera by making use of a parallax. Additionally, in the present embodiment, although one camera 143a is provided in the lighting system 104a, two or more cameras 143a may be provided in the lighting system 104a.

The LiDAR unit 144a is configured to detect a surrounding environment of the vehicle 101. In particular, the LiDAR unit 144a is configured to acquire at first point group data (3D mapping data) indicating a surrounding environment of the vehicle 101 and to then transmit the point group data to the control unit 140a. The control unit 140a identifies surrounding environment information based on the point group data transmitted thereto. Here, the surrounding environment information may include information on a target object existing at an exterior of the vehicle 101. For example, the surrounding environment information may include information on an attribute of a target object existing at an exterior of the vehicle 101 and information on a distance and a position of the target object with respect to the vehicle 101 and information on a traveling direction of the target object.

More specifically, the LiDAR unit 144a can acquire at first information on a time of flight (TOF) $\Delta T1$ of a laser beam (a light pulse) at each emission angle (a horizontal angle $\theta$, a vertical angle $\varphi$) of the laser beam and can then acquire information on a distance D between the LiDAR unit 144a (the vehicle 101) and an object existing at an exterior of the vehicle 101 at each emission angle (a horizontal angle $\theta$, a vertical angle $\varphi$) based on the information on the time of flight $\Delta T1$. Here, the time of flight $\Delta T1$ can be calculated as follows, for example.

Time of flight ΔT1=a time t1 when a laser beam (a light pulse) returns to LiDAR unit–a time t0 when LiDAR unit emits the laser beam (the light pulse).

In this way, the LiDAR unit 144a can acquire the point group data (the 3D mapping data) indicating the surrounding environment of the vehicle 101.

The LiDAR unit 144a includes, for example, a light emitting module configured to emit a laser beam, an optical deflector configured to scan a laser beam in a horizontal direction and a vertical direction, an optical system such as a lens, and an acceptance module configured to accept or receive a laser beam reflected by an object. There is imposed no specific limitation on a central wavelength of a laser beam emitted from the laser light source. For example, a laser beam may be invisible light whose central wavelength is near 900 nm. The optical deflector may be, for example, an MEMS mirror or a polygon mirror. In the case that the optical deflector is a polygon mirror, the LiDAR unit 144a scans a laser beam along a predetermined direction at all times. On the other hand, when the optical deflector is an MEMS mirror, the LiDAR unit 144a scans a laser beam in a predetermined direction and afterwards scans the laser bam in an opposite direction to the predetermined direction (that is, the laser beam moves in a reciprocating fashion).

The acceptance module may be, for example, a photodiode. The LiDAR unit 144a may acquire point group data without scanning the laser beam by the optical deflector. For example, the LiDAR unit 144a may acquire point group data by use of a phased array method or a flash method. In addition, in the present embodiment, although one LiDAR unit 144a is provided in the lighting system 104a, two or more LiDAR units 144a may be provided in the lighting system 104a. For example, when two LiDAR units 144a are provided in the lighting system 104a, one LiDAR unit 144a may be configured to detect a surrounding environment in a front area ahead of the vehicle 101, while the other LiDAR unit 144a may be configured to detect a surrounding environment in a side area to the vehicle 101.

Additionally, the LiDAR unit 144a may scan a laser beam at a predetermined angular pitch in a horizontal direction (a predetermined scanning resolution in the horizontal direction) and a predetermined angular pitch in an up-and-down direction (a predetermined scanning resolution in the up-and-down direction).

The millimeter wave radar 145a is configured to detect a surrounding environment of the vehicle 101. In particular, the millimeter wave radar 145a is configured to acquire at first detection data indicating a surrounding environment of the vehicle 101 and then transmit the detection data to the control unit 140a. The control unit 140a identifies surrounding environment information based on the transmitted detection data. Here, the surrounding environment information may include information on a target object existing at an exterior of the vehicle 101. The surrounding environment information may include, for example, information on an attribute of a target object existing at an exterior of the vehicle 101, information on a position of the target object with respect to the vehicle 101, and a speed of the target object with respect to the vehicle 101.

For example, the millimeter wave radar 145a can acquire a distance D between the millimeter wave radar 145a (the vehicle 101) and an object existing at an exterior of the vehicle 101 by use of a pulse modulation method, an FM-CW method or a dual frequency CW method. In the case that the pulse modulation method is used, the millimeter wave radar 145a can acquire at first information on a time of flight ΔT2 of a millimeter wave at each emission angle of the millimeter wave and then acquire information on a distance D between the millimeter wave radar 145a (the vehicle 101) and an object existing at an exterior of the vehicle 101 at each emission angle. Here, the time of flight ΔT2 can be calculated, for example, as follows.

Time of flight ΔT2=a time t3 when a millimeter wave returns to the millimeter wave radar–a time t2 when the millimeter wave radar emits the millimeter wave Additionally, the millimeter wave radar 145a can acquire information on a relative velocity V of an object existing at an exterior of the vehicle 101 to the millimeter wave radar 145a (the vehicle 101) based on a frequency f0 of a millimeter wave emitted from the millimeter wave radar 145a and a frequency f1 of the millimeter wave that returns to the millimeter wave radar 145a.

Additionally, in the present embodiment, although one millimeter wave radar 145a is provided in the lighting system 104a, two or more millimeter wave radars 145a may be provided in the lighting system 104a. For example, the lighting system 104a may include a short-distance millimeter wave radar 145a, a middle-distance millimeter wave radar 145a, and a long-distance millimeter wave radar 145a.

The actuator 146a is configured to change a tilt angle θ of the LiDAR unit 144a in the up-and-down direction of the vehicle 101. For example, an example of the actuator 146a used in the present embodiment includes, as shown in FIG. 12, an electromagnetic solenoid 462 and a shaft 463 connected to the electromagnetic solenoid 462. The electromagnetic solenoid 462 is configured to convert electric energy into mechanical energy and can move the shaft 463 in a front-and-rear direction.

The lighting system 104b further includes a control unit 140b, a lighting unit 142b, a camera 143b, a LiDAR unit 144b, a millimeter wave radar 145b, and an actuator 146b. As shown in FIG. 8, the control unit 140b, the lighting unit 142b, the camera 143b, the LiDAR unit 144b, the millimeter wave radar 145b, and the actuator 146b are disposed in an interior of a space Sb defined by the housing 124b and the transparent cover 122b. The control unit 140b may be disposed in a predetermined place on the vehicle 101 other than the space Sb. For example, the control unit 140b may be configured integrally with the vehicle control unit 103. The control unit 140b may have a similar function and configuration to those of the control unit 140a. The lighting unit 142b may have a similar function and configuration to those of the lighting unit 142a. In this respect, the lighting unit 142a functions as the left headlamp unit, while the lighting unit 142b functions as a right headlamp unit. The camera 143b may have a similar function and configuration to those of the camera 143a. The LiDAR unit 144b may have a similar function and configuration to those of the LiDAR unit 144a. The millimeter wave radar 145b may have a similar function and configuration to those of the millimeter wave radar 145a. The actuator 146b may have a similar function and configuration to those of the actuator 146a.

The lighting system 104c further includes a control unit 140c, a lighting unit 142c, a camera 143c, a LiDAR unit 144c, a millimeter wave radar 145c, and an actuator 146c. As shown in FIG. 8, the control unit 140c, the lighting unit 142c, the camera 143c, the LiDAR unit 144c, and the millimeter wave radar 145c are disposed in an interior of a space Sc (a lamp compartment) defined by the housing 124c and the transparent cover 122c. The control unit 140c may be disposed in a predetermined place on the vehicle 101 other than the space Sc. For example, the control unit 140c may be configured integrally with the vehicle control unit 103. The control unit 140c may have a similar function and configuration to those of the control unit 140a.

The lighting unit 142c is configured to form a light distribution pattern by emitting light towards an exterior (a rear) of the vehicle 101. The lighting unit 142c includes a light source for emitting light and an optical system. The light source may be made up, for example, of a plurality of light emitting devices that are arranged into a matrix configuration (for example, N rows×M columns, N>1, M>1). The light emitting device is, for example, an LED, an LD or an organic EL device. The optical system may include at least one of a reflector configured to reflect light emitted from the light source towards the front of the lighting unit 142c and a lens configured to refract light emitted directly from the light source or light reflected by the reflector. In the case where the driving mode of the vehicle 101 is the manual driving mode or the driving assistance mode, the lighting unit 142c may be turned off. On the other hand, in the case where the driving mode of the vehicle 101 is the high-degree driving assistance mode or the complete autonomous driving mode, the lighting unit 142c may be configured to form a light distribution pattern for a camera behind the vehicle 101.

The camera 143c may have a similar function and configuration to those of the camera 143a. The LiDAR unit 144c may have a similar function and configuration to those of the LiDAR unit 144c. The millimeter wave radar 145c may have a similar function and configuration to those of the millimeter wave radar 145a. The actuator 146c may have a similar function and configuration to those of the actuator 146a.

The lighting system 104d further includes a control unit 140d, a lighting unit 142d, a camera 143d, a LiDAR unit 144d, and a millimeter wave radar 145d. As shown in FIG. 8, the control unit 140d, the lighting unit 142d, the camera 143d, the LiDAR unit 144d, and the millimeter wave radar 145d are disposed in an interior of a space Sd (a lamp compartment) defined by the housing 124d and the transparent cover 122d. The control unit 140d may be disposed in a predetermined place on the vehicle 101 other than the space Sd. For example, the control unit 140d may be configured integrally with the vehicle control unit 103. The control unit 140d may have a similar function and configuration to those of the control unit 140c. The lighting unit 142d may have a similar function and configuration to those of the lighting unit 142c. The camera 143d may have a similar function and configuration to those of the camera 143c. The LiDAR unit 144d may have a similar function and configuration to those of the LiDAR unit 144c. The millimeter wave radar 145d may have a similar function and configuration to those of the millimeter wave radar 145c. The actuator 146d may have a similar function and configuration to those of the actuator 146c.

Figure 10:
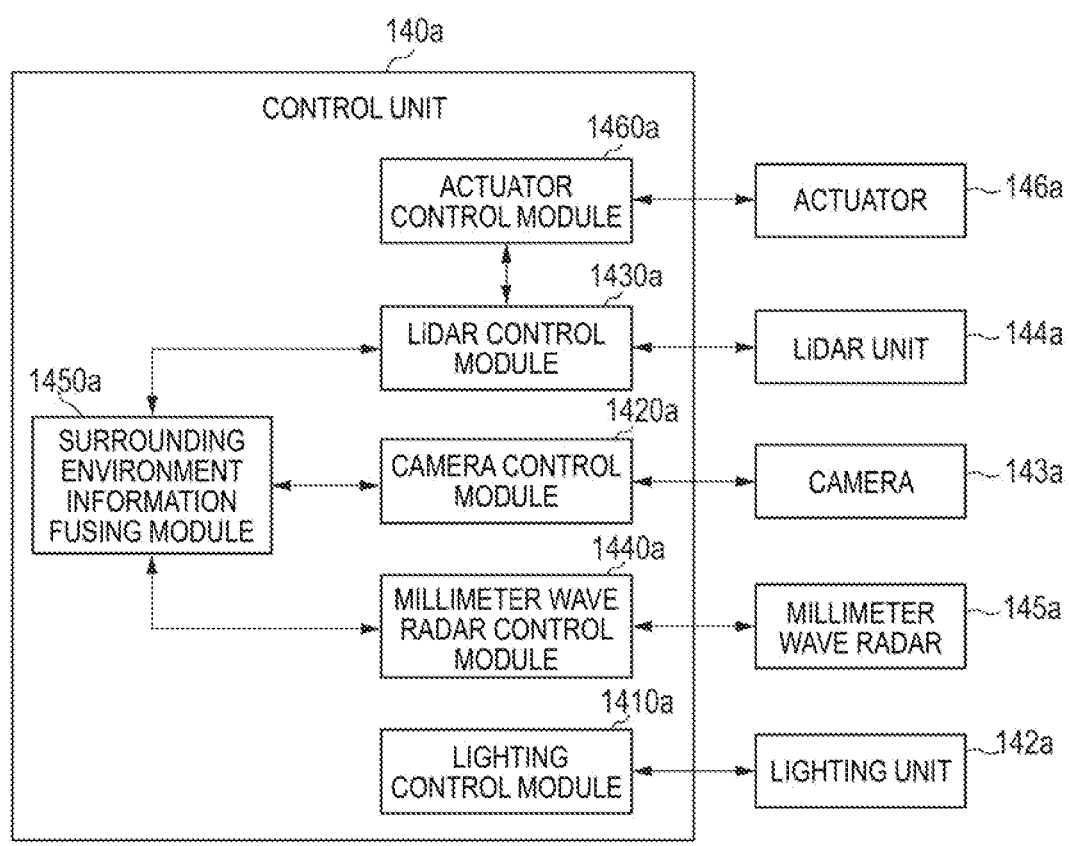
FIG. 10 is a functional block diagram of a control unit for a left front lighting system.

Next, referring to FIG. 10, the function of the control unit 140a will be described. FIG. 10 is a drawing showing functional blocks of the control unit 140a of the lighting system 104a. As shown in FIG. 10, the control unit 140a is configured to control individual operations of the lighting unit 142a, the camera 143a, the LiDAR unit 144a, the millimeter wave radar 145a, and the actuator 146a. In particular, the control unit 140a includes a lighting control module 1410a, a camera control module 1420a, a LiDAR control module 1430a, a millimeter wave control module 1440a, an actuator control module 1460a, and a surrounding environment information fusing module 1450a.

The lighting control module 1410a is configured to control the lighting unit 142a such that the lighting unit 142a emits a predetermined light distribution pattern towards a front area ahead of the vehicle 101 For example, the lighting control module 1410a may change the light distribution pattern that is emitted from the lighting unit 142a in accordance with the driving mode of the vehicle 101.

The camera control module 1420a is configured not only to control the operation of the camera 143a but also to generate surrounding environment information of the vehicle 101 in a detection area S10 (refer to FIG. 11) of the camera 143a (hereinafter, referred to as surrounding environment information I1) based on image data outputted from the camera 143a. The LiDAR control module 1430a is configured not only to control the operation of the LiDAR unit 144a but also to generate surrounding environment information of the vehicle 101 in a detection area S12 (refer to FIG. 11) of the LiDAR unit 144a (hereinafter, referred to as surrounding environment information I2) based on point group data outputted from the LiDAR unit 144a. The millimeter wave radar control module 1440a is configured not only to control the operation of the millimeter wave radar 145a but also to generate surrounding environment information of the vehicle 101 in a detection area S13 (refer to FIG. 11) of the millimeter wave radar 145a (hereinafter, referred to as surrounding environment information I3) based on detection data outputted from the millimeter wave radar 145a.

Figure 11:
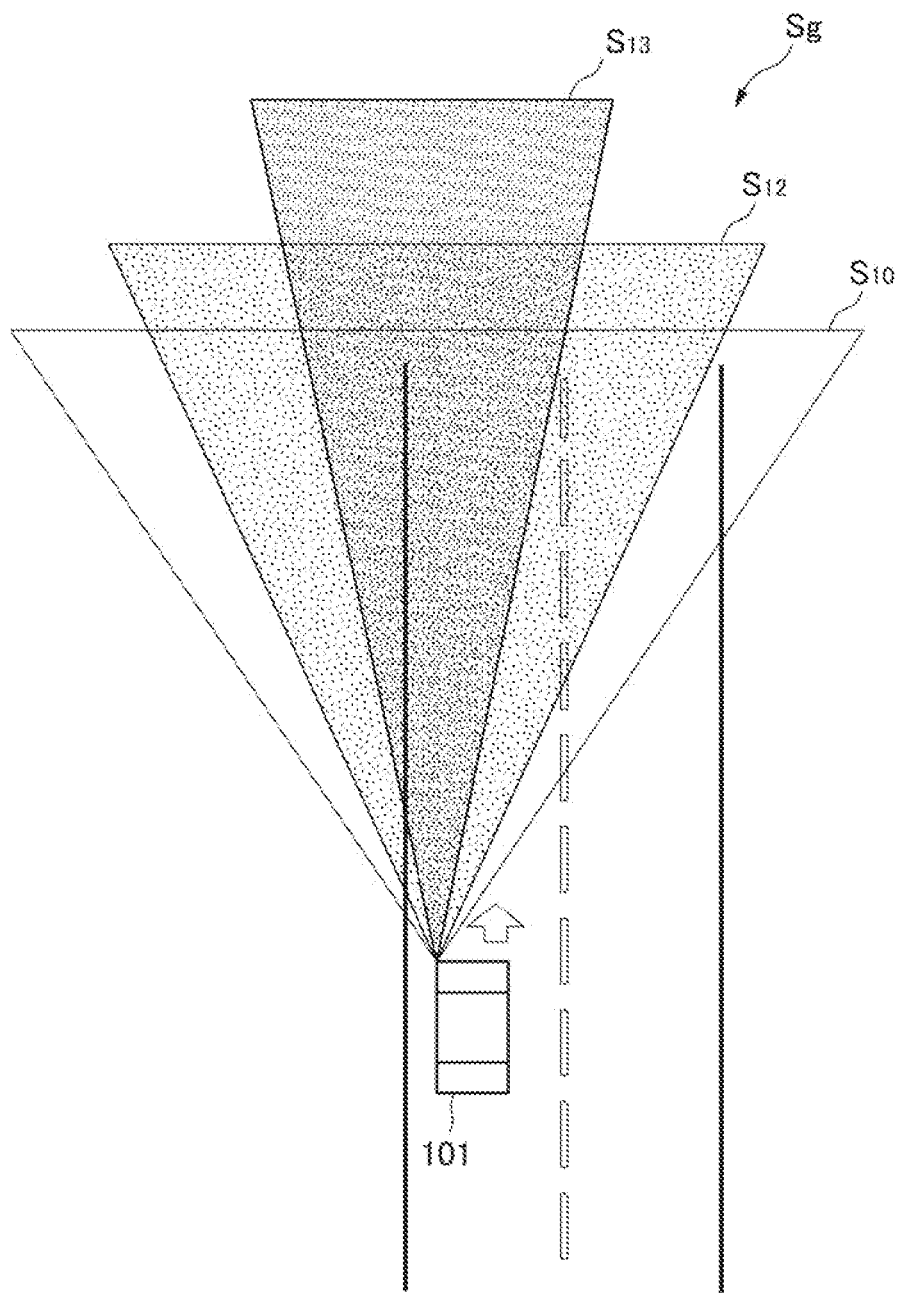
FIG. 11 is a drawing illustrating a detection area by a camera, a detection area by a LiDAR unit, and a detection area by a millimeter wave radar of the left front lighting system.

The surrounding environment information fusing module 1450a is configured to fuse the pieces of peripheral environment information I1, I2, I3 together so as to generate fused surrounding environment information Ig. Here, the surrounding environment information Ig may include information on a target object existing at an exterior of the vehicle 101 in a detection area Sg that is a combination of the detection area S10 of the camera 143a, the detection area S12 of the LiDAR unit 144a, and the detection area S13 of the millimeter wave radar 145a as shown in FIG. 11. For example, the surrounding environment information Ig may include information on an attribute of a target object, a position of the target object with respect to the vehicle 101, a distance between the vehicle 101 and the target object, a velocity of the target object with respect to the vehicle 101, and/or a traveling direction of the target object. The surrounding environment information fusing module 1450a transmits the surrounding environment information Ig to the vehicle control unit 103.

The actuator control module 1460a is configured to control the driving of the actuator 146a. In particular, the actuator control module 1460a can determine a tilt angle of the LiDAR unit 144a in the up-and-down direction of the vehicle 101 by controlling the driving of the actuator 146a.

Figure 12A:
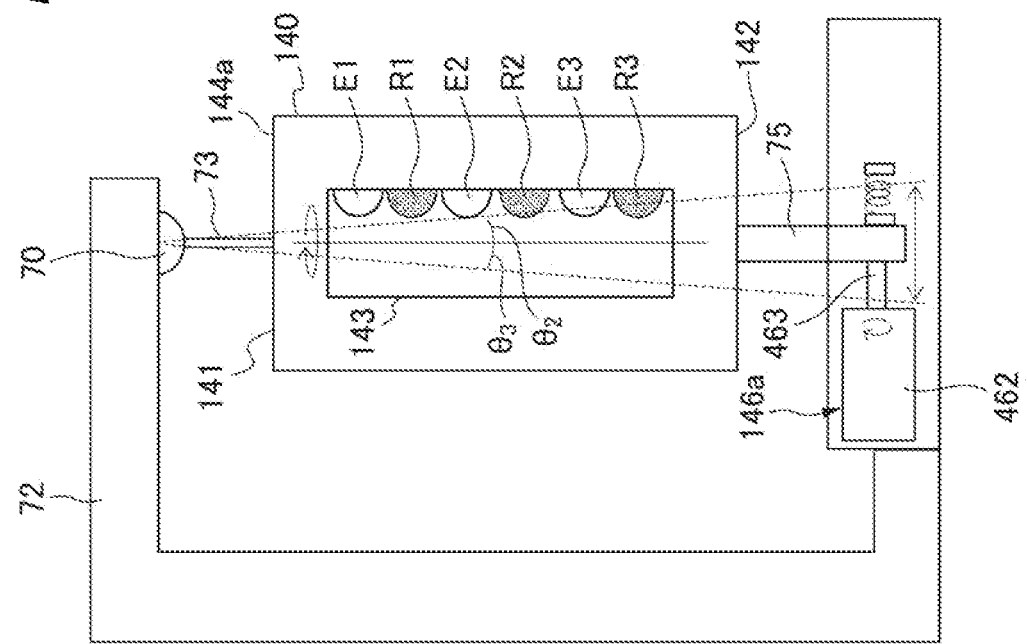
FIG. 12A is a schematic drawing showing the LiDAR unit and an actuator as seen from a right side.
Figure 12B:
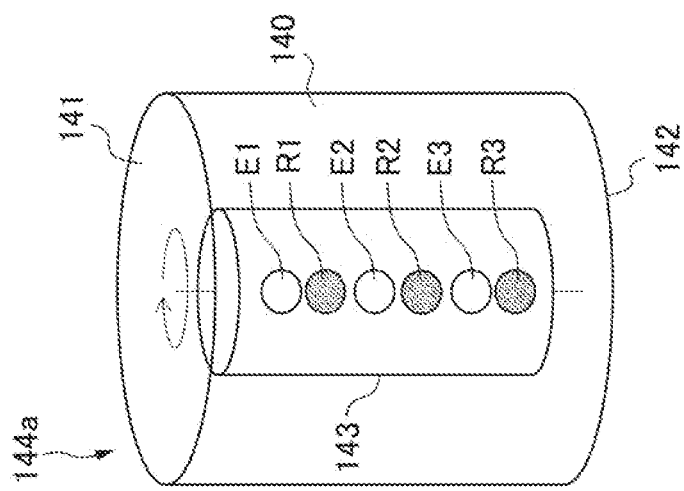
FIG. 12B is a schematic drawing showing the LiDAR unit as seen from a front.

Next, referring to FIGS. 12A, 12B, an example of a configuration of the LiDAR unit 144a according the present embodiment will be described as below. FIG. 12A is a schematic drawing showing the LiDAR unit 144a and the actuator 146a as seen from a right side. FIG. 12B is a schematic drawing of the LiDAR unit 144a as seen from a front.

As shown in FIGS. 12A, 12B, the LiDAR unit 144a includes a LiDAR unit main body 143 and a housing 140 that houses the LiDAR unit main body 143. The LiDAR unit main body 143 includes three light emitting modules E1 to E3 configured to emit a laser beam (a light pulse) towards an exterior of the vehicle 101 and three light receiving modules R1 to R3 configured to receive laser beams that are reflected or refracted by an object existing ahead of the vehicle 101.

For example, the LiDAR unit 144a can scan a laser beam in the horizontal direction by the LiDAR unit main body 143 being driven rotationally. The three light emitting modules E1 to E3 may each be configured to emit a laser beam (a light pulse) at the same timing. In addition, the three light emitting modules E1 to E3 may each be configured to emit a laser beam at a different angle in the up-and-down direction. An angle difference in the up-and-down direction between an emission angle of a laser beam emitted from the light emitting module E1 and an emission angle of a laser beam emitted from the light emitting module E2 is, for example, three degrees. Additionally, an angle difference in the up-and-down direction between an emission angle of a laser beam emitted from the light emitting module E2 and an emission angle of a laser beam emitted from the light emitting module E3 is, for example, three degrees. In the present embodiment, although the numbers of light emitting modules and light receiving modules are three, the numbers of light emitting modules and light receiving modules are not limited to three. Further, the angle difference between the emission angles of laser beams is not limited to three degrees.

An upper end face 141 of the housing 140 is connected to a fulcrum 70 of a frame body 72 via an upper support shaft 73, and a lower end face 142 of the housing 140 is connected to a shaft 463 via a lower support shaft 75. The upper support shaft 73 is rotationally fixed to the fulcrum 70. The LiDAR unit 144a remains parallel to the up-and-down direction before the actuator 146a is driven (that is, the tilt angle of the LiDAR unit 144a from the up-and-down direction is zero).

For example, a case will be described in which the LiDAR unit 144a tilts forwards such that the tilt angle of the LiDAR unit 144a becomes θ2 with respect to the up-and-down direction. Here, the tilt angle θ2 is referred to as a maximum tilt angle of the LiDAR unit 144a (a maximum value of the tilt angle) in the front direction. In this case, the actuator control module 1460a transmits a control signal (an electric signal) corresponding the tilt angle θ2 to the actuator 146a. Thereafter, the electromagnetic solenoid 462 of the actuator 146a moves the shaft 463 to a position corresponding to the tilt angle θ2 based on the control signal received from the actuator control module 1460a. In this way, the LiDAR unit 144a tilts forwards by the tilt angle θ2 about the fulcrum 70.

Additionally, a case will be described in which the LiDAR unit 144a tilts rearwards such that the tilt angle of the LiDAR unit 144a becomes θ3 with respect to the up-and-down direction. Here, the tilt angle θ3 is referred to as a maximum tilt angle of the LiDAR unit 144a (a maximum value of the tilt angle) in the rear direction. In this case, the actuator control module 1460a transmits a control signal (an electric signal) corresponding the tilt angle θ3 to the actuator 146a. Thereafter, the electromagnetic solenoid 462 of the actuator 146a moves the shaft 463 to a position corresponding to the tilt angle θ3 based on the control signal received from the actuator control module 1460a. In this way, the LiDAR unit 144a tilts rearwards by the tilt angle θ3 about the fulcrum 70.

Figure 13:
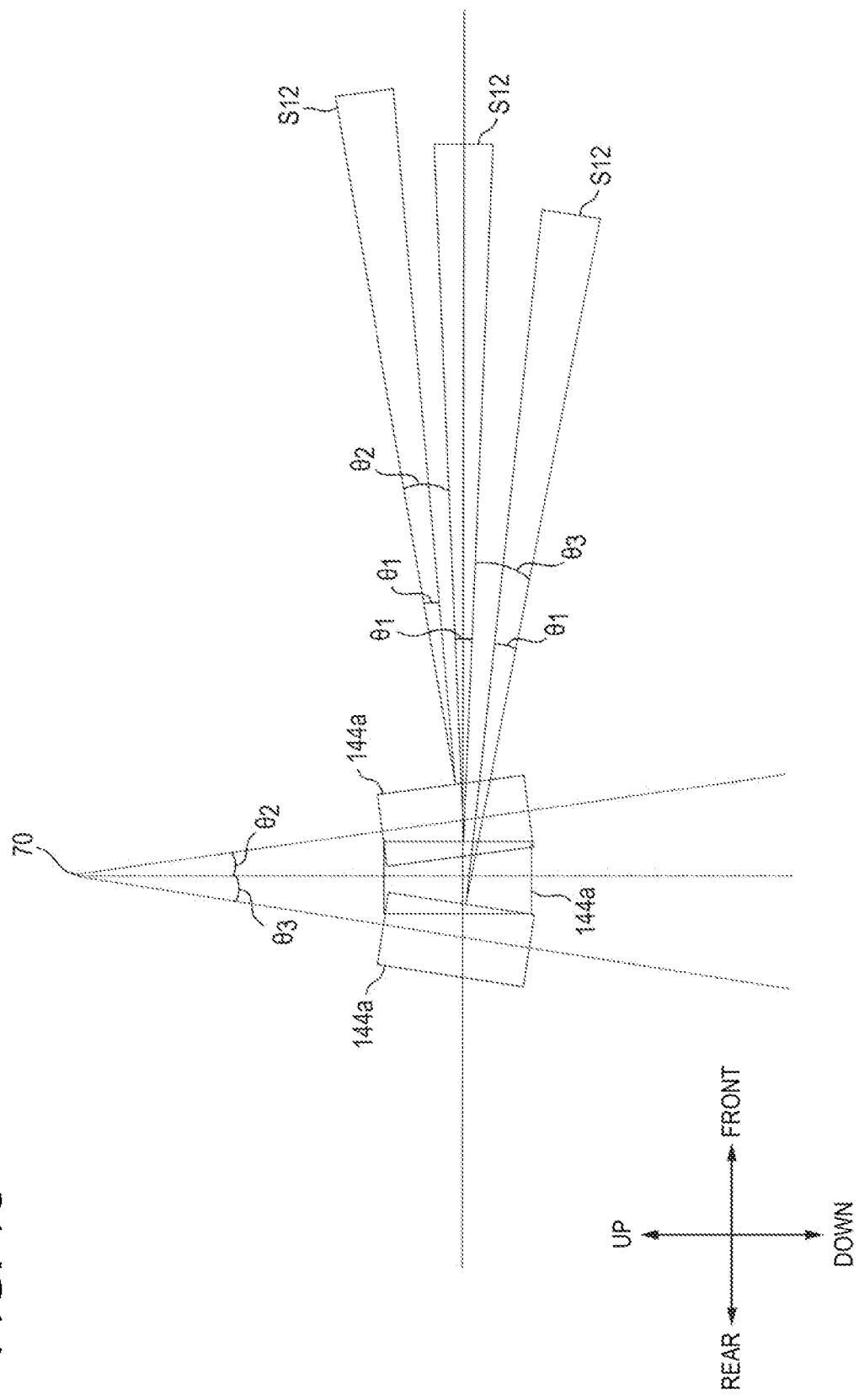
FIG. 13 is a drawing showing a state in which the detection area of the LiDAR changes in an up-and-down direction by the LiDAR tilting in the up-and-down direction.

As shown in FIG. 13, in the case in which the LiDAR unit 144a tilts forwards such that the tilt angle of the LiDAR unit 144a from the up-and-down direction becomes θ2, the detection area S12 of the LiDAR unit 144a tilts upwards by an angle θ2. On the other hand, in the case in which the LiDAR unit 144a tilts rearwards so that the tilt angle of the LiDAR unit 144a from the up-and-down direction becomes θ3, the detection area S12 of the LiDAR unit 144a tilts downwards by an angle θ3. In this way, the detection area S12 of the LiDAR unit 144a can be expanded in the up-and-down direction by the actuator control module 1460a causing the LiDAR unit 144a to tilt relative to the up-and-down direction using the actuator 146a.

The tilt angle θ2 is the maximum tilt angle of the LiDAR unit 144a in the front direction, and the tilt angle θ3 is the maximum tilt angle of the LiDAR unit 144a in the rear direction. In fact, it should be noted that since the LiDAR unit 144a tilts gradually from the up-and-down direction, a detection area S120 tilts gradually upwards and downwards. In the following description, a detection area of the LiDAR unit 144a that is obtained by the tilting control of the LiDAR unit 144a (that is, the detection area S12 that is expanded in the up-and-down direction) will be referred to as the detection area S120.

Figure 14A:
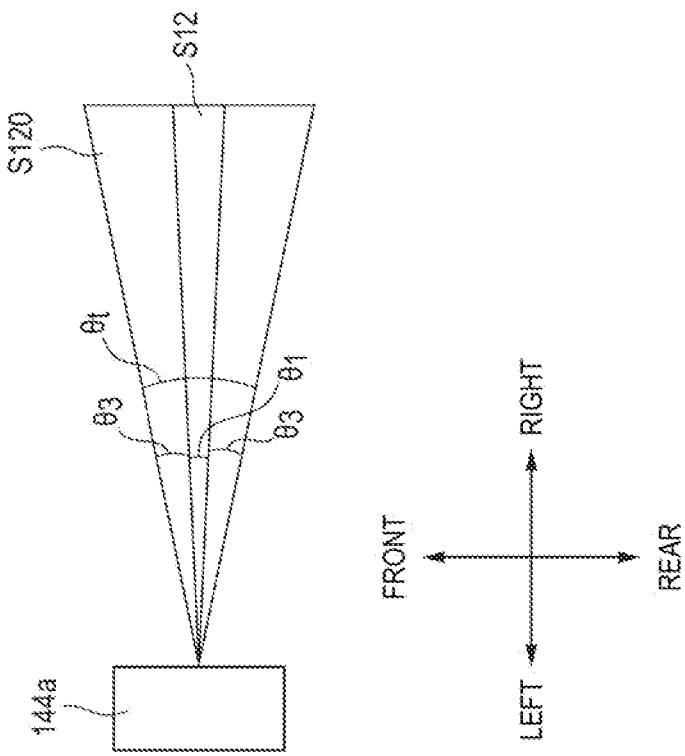
FIG. 14A is a drawing showing a detection area of the LiDAR unit in a horizontal direction (a detection area before expansion and a detection area after expansion).
Figure 14B:
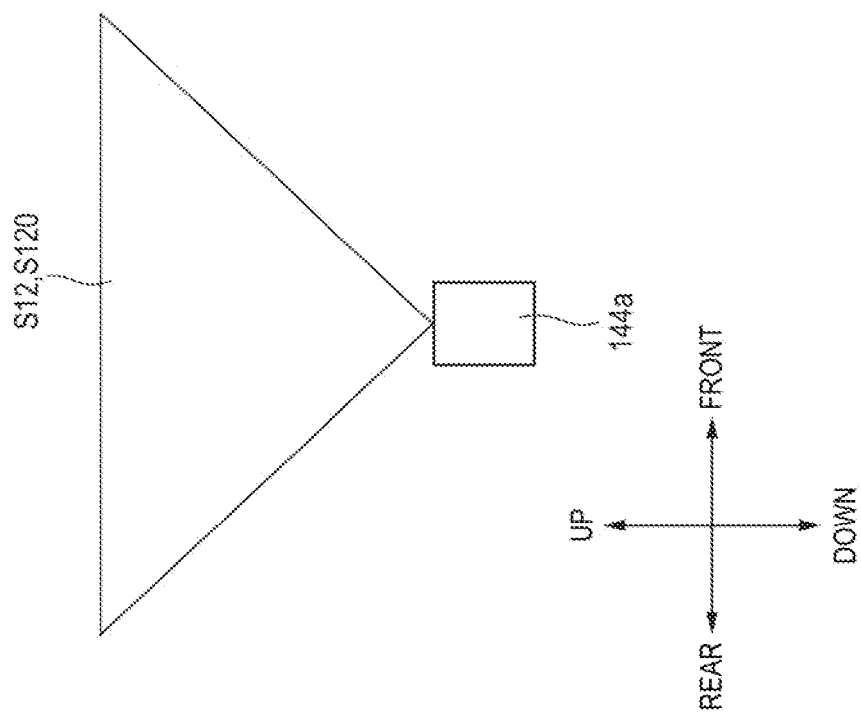
FIG. 14B is a drawing showing a detection area of the LiDAR unit in the up-and-down direction (a detection area before expansion and a detection area after expansion).

Next, referring to FIGS. 14A, 14B, angular ranges of the detection areas S12, S120 of the LiDAR unit 144a in the horizontal direction and the up-and-down direction will be described. FIG. 14A shows the detection area S12 and the detection area S120 (the detection area S12 expanded in the up-and-down direction) in the horizontal direction. FIG. 14B shows the detection areas S10, S120 in the up-and-down direction.

As shown in FIG. 14A, an angular range of the detection area S12 coincides with an angular range of the detection area S120 in the horizontal direction. On the other hand, as shown in FIG. 14B, an angular range θt of the detection area S120 in the up-and-down direction is greater than an angular range θ1 of the detection area S12 in the up-and-down direction. In this respect, since the tilt angle θ2 is the maximum tilt angle of the LiDAR unit 144a in the front direction, and the tilt angle θ3 is the maximum tilt angle of the LiDAR unit 144a in the rear direction, the angular range θt of the detection area S120 is specified as expressed by the following expression (1).

$$\text{Angular range } \theta t = \theta 1 + \theta 2 + \theta 3 \qquad (1)$$

In this way, then angular range θt of the detection area S120 in the up-and-down direction is increased to be greater by (θ2+θ3) than the angular range θ1 of the detection area S12 in the up-and-down direction.

In this way, according to the present embodiment, since the tilt angle of the LiDAR unit 144a with respect to the up-and-down direction of the vehicle 101 can be changed by use of the actuator 146a, the detection area S12 (the angular range) of the LiDAR unit 144a in the up-and-down direction can be expanded. In this way, the lighting system 104a (the sensing system) can be provided in which the accuracy of recognition of the surrounding environment of the vehicle 101 can be improved. In particular, information on a target object such as a pedestrian existing around the vehicle 101 (for example, attribute information) can be acquired with high accuracy.

Figure 15:
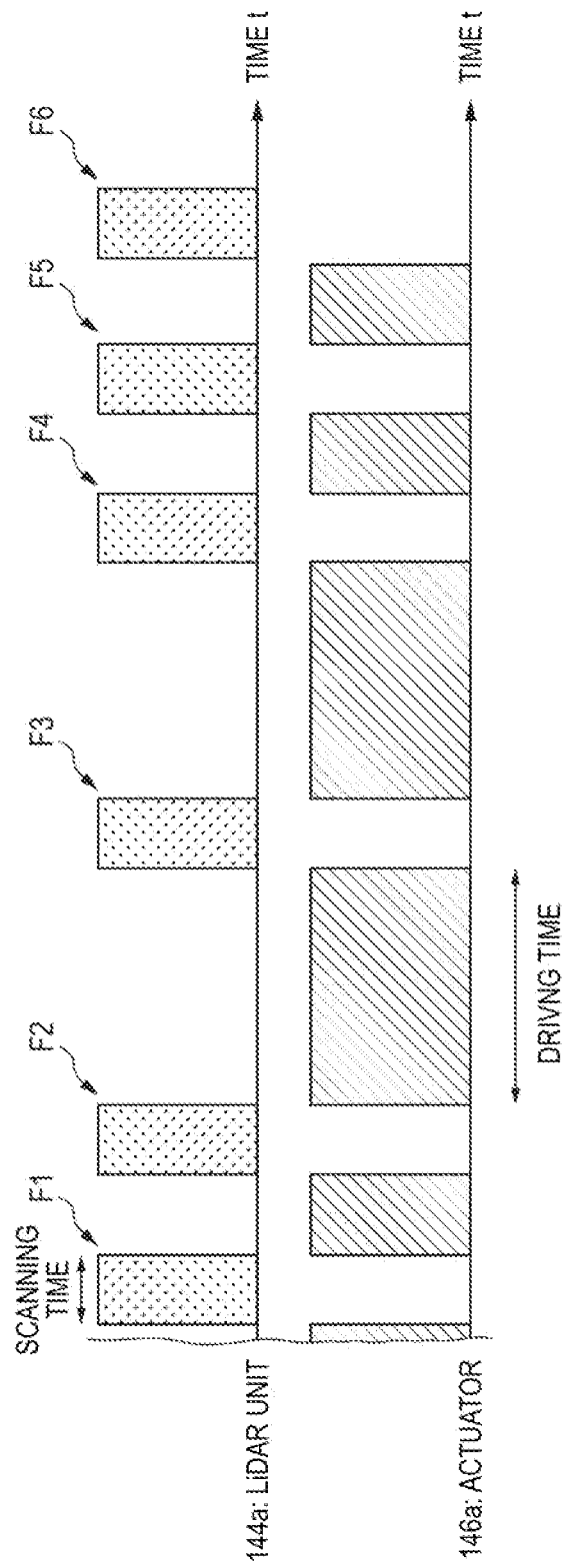
FIG. 15 is a drawing (Part 1) explaining a relationship between a scanning time of the LiDAR unit and a driving time of the actuator.
Figure 16:
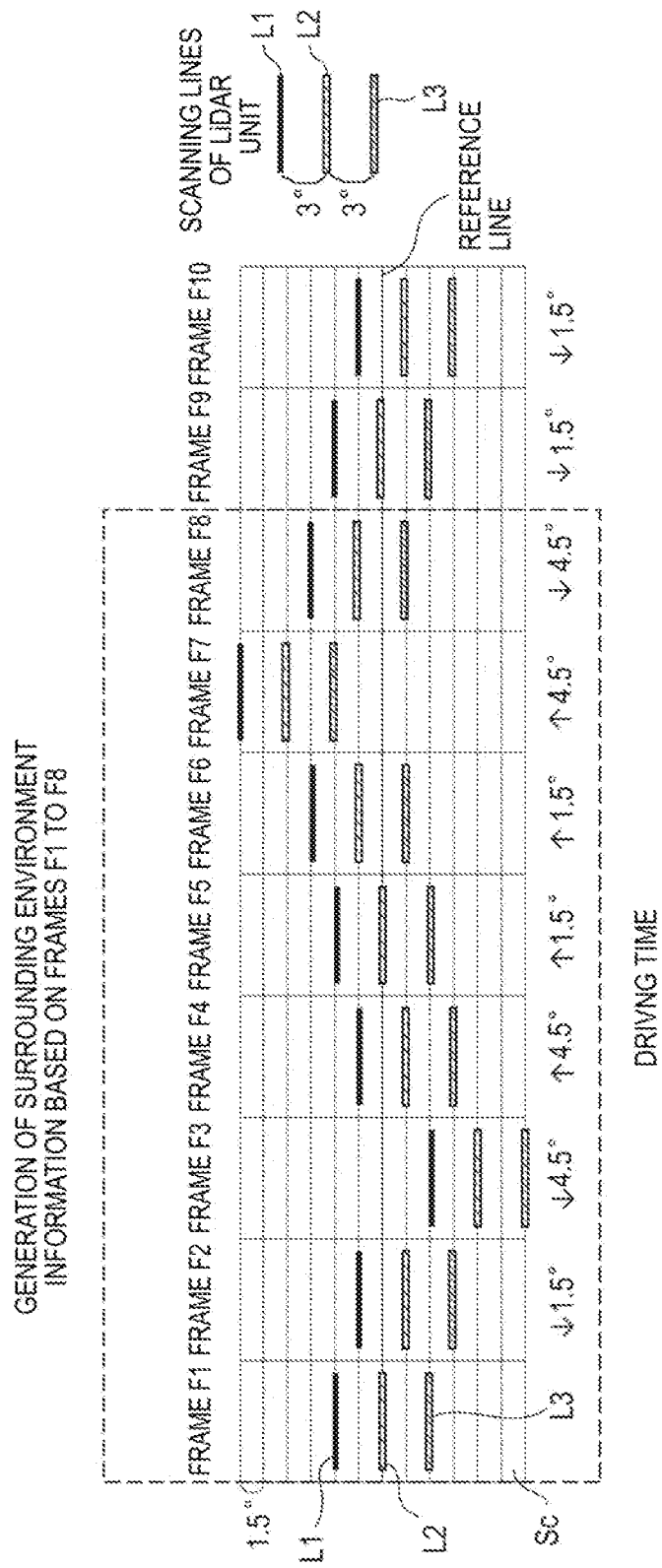
FIG. 16 is a drawing (Part 1) showing angular changes of three scanning lines between frames of point group data.

Next, referring to FIGS. 15 and 16, frames of point group data acquired by the LiDAR unit 144a will be described. FIG. 15 is a drawing explaining a relationship between a scanning time of the LiDAR unit 144a and a driving time of the actuator 146a. FIG. 16 is a drawing showing angular changes of three scanning lines between frames F1 to F10 of the point group data.

As shown in FIG. 15, the actuator control module 1460a does not cause the actuator 146a to be driven during a scanning time (a scanning time of the LiDAR unit 144a) during which the LiDAR unit 144a is scanning a laser beam. In particular, the actuator control module 1460a does not cause the actuator 146a to be driven during a scanning time of the LiDAR unit 144a while frames Fn (n is a natural number) of point group data are being acquired. For example, the actuator 146*a* causes the LiDAR unit 144*a* to tilt relative to the up-and-down direction after scanning a laser beam to acquire a frame F2 of point group data ends. Thereafter, the LiDAR unit 144*a* scans a laser beam to acquire a subsequent frame F3. In this way, the actuator control module 1460*a* controls to drive the actuator 146*a* so that the scanning time of the LiDAR unit 144*a* does not overlap the driving time of the actuator 146*a*. The driving time of the actuator 146*a* may be set at N times (N is a natural number) the scanning time of the LiDAR unit 144*a*.

In FIGS. 15 and 16, a frame F1 is not necessarily a frame of point group data which is to be acquired initially by the LiDAR unit 144*a*. Frames F1, F5, F9 are frames of point group data that are to be acquired when the LiDAR unit 144*a* does not tilt relative to the up-and-down direction. Additionally, a scanning time of the LiDAR unit 144*a* shown in FIG. 15 does not include a signal processing time required to generate point group data after the light receiving modules R1 to R3 receive a laser beam.

In FIG. 16, three scanning lines L1 to L3 are shown between frames F1 to F10. In particular, FIG. 16 shows scanning lines L1 to L3 that are projected on to an imaginary screen Sc that is set imaginarily in front of the vehicle 101. The imaginary screen Sc is set to be perpendicular to the horizontal direction of the vehicle 101. The scanning line is a locus of laser beam points formed on the imaginary screen as a result of scanning of a laser beam. The scanning line L1 is a scanning line of a laser beam emitted from the light emitting module E1 (refer to FIG. 12). The scanning line L2 is a scanning line of a laser beam emitted from the light emitting module E2. The scanning line L3 is a scanning line of a laser beam emitted from the light emitting module E3.

Additionally, since the angle difference in the up-and-down direction between the emission angle of the laser beam emitted from the light emitting module E1 and the emission angle of the laser beam emitted from the light emitting module E2 is three degrees, an angular interval in the up-and-down direction between the scanning line L1 and the scanning line L2 is three degrees. Similarly, since the angle difference in the up-and-down direction between the emission angle of the laser beam emitted from the light emitting module E2 and the emission angle of the laser beam emitted from the light emitting module E3 is 3 degrees, an angular interval in the up-and-down direction between the scanning line L2 and the scanning line L3 is 3 degrees. In addition, an angle difference in the up-and-down direction between the scanning line L1 and the scanning line L3 is 6 degrees. In this way, the angular range of the detection area S12 in the up-and-down direction is understood to be 6 degrees. It should be noted that the angle difference and the angular range of the detection area S12 described above only constitute an example. Further, in the present embodiment, since the LiDAR unit 144*a* includes the three light emitting modules E1 to E3, the three scanning lines L1 to L3 are projected on to the imaginary screen Sc. On the other hand, when the LiDAR unit 144*a* includes N (N>3) light emitting modules, N scanning lines are to be projected on the imaginary screen Sc.

Next, an angle change in the up-and-down direction occurring in the scanning lines L1 to L3 when frames F2 to F9 of point group data are acquired will be described. It is premised that a frame F1 is a frame of point group data that is to be acquired when the LiDAR unit 144*a* does not tilt relative to the up-and-down direction. The scanning line L2 coincides with a reference line when a frame F1 is acquired. The reference line is a line indicating an angle of zero degree in the up-and-down direction. In the case that a predetermined scanning line coincides with the reference line, a laser beam that forms the predetermined scanning line is emitted parallel to the horizontal direction.

Firstly, the actuator 146*a* causes the LiDAR unit 144*a* to tilt 1.5 degrees to the rear after scanning a laser beam to acquire a frame F1 ends. Thereafter, the LiDAR unit 144*a* scans a laser beam, whereby the detection area S12 of the LiDAR unit 144*a* tilts 1.5 degrees downwards. In this way, when a frame F2 is acquired, the scanning line 2 tilts 1.5 degrees downwards. Next, with the LiDAR unit 144*a* caused to tilt 1.5 degrees rearwards, the actuator 146*a* moves the LiDAR unit 144*a* towards the rear by 4.5 degrees. Thereafter, the LiDAR unit 144*a* scans a laser beam, whereby the detection area S12 of the LiDAR unit 144*a* tilts 6 degrees downwards (=1.5 degrees+4.5 degrees). In this way, when a frame F3 is acquired, the scanning line L2 tilts 6 degrees downwards.

Next, with the LiDAR unit 144*a* caused to tilt 6 degrees rearwards, the actuator 146*a* moves the LiDAR unit 144*a* 4.5 degrees forwards. Thereafter, the LiDAR unit 144*a* scans a laser beam, whereby the detection area S12 of the LiDAR unit 144*a* tilts 1.5 degrees (=6 degrees−4.5 degrees) downwards. In this way, when a frame F4 is acquired, the scanning line L2 tilts 1.5 degrees downwards.

Next, with the LiDAR unit 144*a* caused to tilt 1.5 degrees rearwards, the actuator 146*a* moves the LiDAR unit 144*a* 1.5 degrees forwards. In this way, when a frame F5 is acquired, the scanning line L2 (the detection area S12) does not tilt in the up-and-down direction.

Next, with the LiDAR unit 144*a* staying horizontal so as not to tilt in the up-and-down direction, the actuator 146*a* moves the LiDAR unit 144*a* 1.5 degrees forwards. In this way, when a frame F6 is acquired, the scanning line L2 (the detection area S12) tilts 1.5 degrees upwards.

Next, with the LiDAR unit 144*a* caused to tilt 1.5 degrees forwards, the actuator 146*a* moves the LiDAR unit 144*a* 4.5 degrees more towards the front. In this way, when a frame F7 is acquired, the scanning line L2 (the detection area S12) tilts 6 degrees upwards.

Next, with the LiDAR unit 144*a* caused to tilt 6 degrees forwards, the actuator 146*a* moves the LiDAR unit 144*a* 4.5 degrees rearwards. In this way, when a frame F8 is acquired, the scanning line L2 (the detection area S12) tilts 1.5 degrees upwards.

Next, with the LiDAR unit 144*a* caused to tilt 1.5 degrees forwards, the actuator 146*a* moves the LiDAR unit 144*a* 1.5 degrees rearwards. In this way, when a frame F9 is acquired, the scanning line L2 (the detection area S12) does not tilt in the up-and-down direction. Similar to the frame F1, a frame F9 is a frame of point group data that is acquired when the LiDAR unit 144*a* does not tilt relative to the up-and-down direction.

In this way, the driving control of the actuator 146*a* that is executed during the acquisition period of the frame F1 to the frame F8 is executed repeatedly. In other words, the tilting control of the LiDAR unit 144*a* executed during the acquisition period of the frame F1 to the frame F8 is executed repeatedly. Angular positions of the scanning lines L1 to L3 in the up-and-down direction when the frame F9 is acquired correspond to the angular positions of the scanning lines L1 to L3 when the frame F1 is acquired. Further, angular positions of the scanning lines L1 to L3 in the up-and-down direction when a frame F10 is acquired correspond to the angular positions of the scanning lines L1 to L3 when the frame F2 is acquired.

The LiDAR control module 1430*a* generates surrounding environment information I2 based on the frames F1 to F8 of the point group data. To describe this in detail, the LiDAR control module 1430*a* generates surrounding environment information I2 by fusing the frames F1 to F8 together. In this way, since the angular position of the detection area S12 (the scanning line) of the LiDAR unit 144*a* in the up-and-down direction differs every time each of the frames is acquired, fusing the frames together can expand the detection area of the LiDAR unit 144*a* in the up-and-down direction (that is, the detection area S120 can be acquired). In particular, in the example shown in FIG. 16, while the angular range of the detection area S12 is 6 degrees, an angular range of the detection area S120 corresponding to the detection area S12 that is expanded by the tilting control of the LiDAR unit 144*a* becomes 18 degrees.

Further, in the present embodiment, while the angular interval between the adjacent scanning lines is 3 degrees, the scanning frames L1 to L3 move in the up-and-down direction at the interval of 1.5 degrees, which is smaller than 3 degrees. In this way, in the detection area S120, as compared with the detection area S12, since the angular interval between the adjacent scanning lines becomes narrow, the space resolution in the up-and-down direction of the point group data can be increased. In this way, the accuracy of the surrounding environment information obtained from the point group data can be improved.

Additionally, according the present embodiment, the actuator control module 1460*a* controls to drive the actuator 146*a* so that the scanning time of the LiDAR unit 144*a* does not overlap the driving time of the actuator 146*a*. Because of this, as shown in FIG. 16, the scanning lines L1 to L3 of the LiDAR unit 144*a* do not tilt. In particular, no angle difference in the up-and-down direction is generated between one end (an initiating point) and the other end (a terminating point) of the scanning line. For example, in the scanning line L1 for acquisition of the frame F2, the angular position does not change in the up-and-down direction. In this way, since the scanning lines L1 to L3 do not tilt, an operation load of the LiDAR control module 1430*a* (ECU) that arithmetically operates the point group data can be reduced.

In the present embodiment, while the actuator 146*a* moves the LiDAR unit 144*a* at the two types of angular intervals (1.5 degrees and 4.5 degrees) between the adjacent frames, the present embodiment is not limited thereto. For example, the actuator 146*a* may move the LiDAR unit 144*a* at one type of angular interval (for example, 1.5 degrees or 4.5 degrees) between the adjacent frames. Here, when the actuator 146*a* moves the LiDAR unit 144*a* at the angular interval of 1.5 degrees between the adjacent frames, the space resolution in the up-and-down direction of the point group data can be improved more. On the other hand, when the actuator 146*a* moves the LiDAR unit 144*a* at the angular interval of 4.5 degrees between the adjacent frames, the detection area of the LiDAR unit 144*a* in the up-and-down direction can be expanded more.

Additionally, the actuator 146*a* may change gradually the tilt angle of the LiDAR unit 144*a* at a first angular interval (for example, 1.5 degrees) within a predetermined angular area from the reference line (for example, within an angular range from 5 degrees downwards to 5 degrees upwards) and may change gradually the tilt angle of the LiDAR unit 144*a* at a second angular interval that is greater than the first angular interval (for example, 4.5 degrees) outside the predetermined angular area. Here, the predetermined angular area from the reference line means a predetermined angular area with respect to the horizontal direction. In this way, the tilt angle of the LiDAR unit 144*a* is changed gradually at the first angular interval within the predetermined angular area, while the tilt angle of the LiDAR unit 144*a* is changed gradually at the second angular interval outside the predetermined angular area. Consequently, the scanning resolution of the LiDAR unit 144*a* can be increased within the predetermined angular area, and the detection area of the LiDAR unit 144*a* in the up-and-down direction can be expanded.

Further, the LiDAR unit 144*a* moves 1.5 degrees between the frame F1 and the frame F2, while the LiDAR unit 144*a* moves 4.5 degrees between the frame F2 and the frame F3. Due to this, as shown in FIG. 15, a driving time Ta1 of the actuator 146*a* between the frame F1 and the frame F2 differs from a driving time Ta2 of the actuator 146*a* between the frame F2 and the frame F3. However, the actuator control module 1460*a* may control and drive the actuator 146*a* such that the driving period Ta1 and the driving period Ta2 becomes the same. In this case, a moving speed of the shaft 463 during the driving time Ta2 is faster than a moving speed of the shaft 463 during the driving time Ta1.

Figure 17:
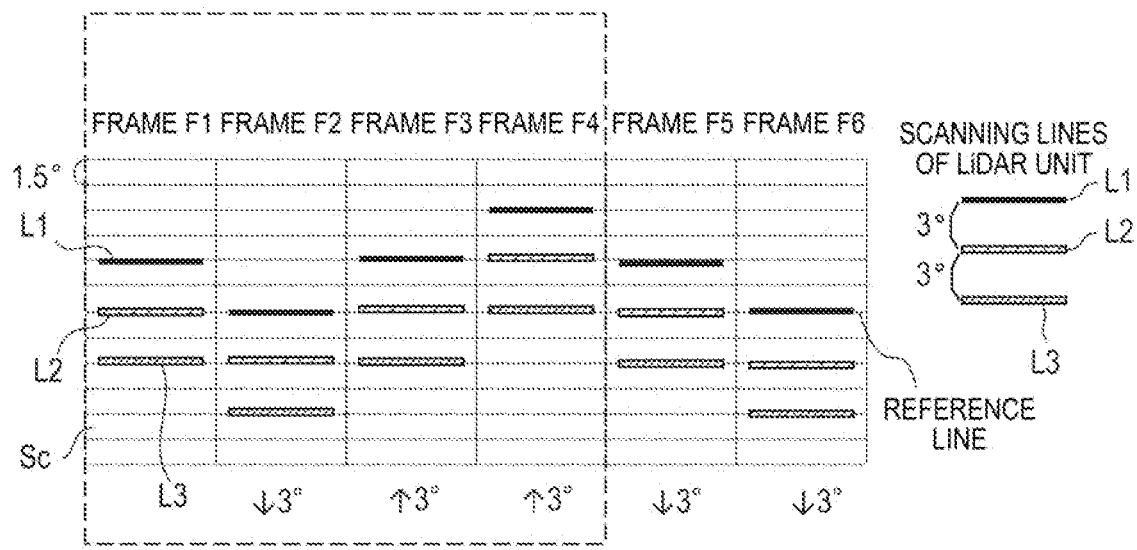
FIG. 17 is a drawing (Part 2) showing angular changes of the three scanning lines between frames of the point group data.

Next, referring to FIG. 17, another example of the tilting control of the LiDAR unit 144*a* will be described. FIG. 17 is a drawing showing angular changes of the three scanning lines L1 to L3 from the frame F1 to the frame 6 of the point group data. It is premised that a frame F1 is a frame of point group data that is to be acquired when the LiDAR unit 144*a* does not tilt relative to the up-and-down direction. When the frame 1 is acquired, the scanning line L2 coincides with the reference line which denotes an angle of zero degree.

As shown in FIG. 17, when the frame F2 is acquired, with the scanning line L1 coinciding with the reference line, the scanning line L2 tilts three degrees downwards. Next, when the frame F3 is acquired, the scanning line L2 coincides with the reference line. Next, when the frame F4 is acquired, with the scanning line L3 coinciding with the reference line, the scanning line L2 tilts three degrees upwards. When the frame F5 is acquired, the scanning line L2 coincides with the reference line.

In this way, the driving control of the actuator 146*a* that is executed during the acquisition period of the frame F1 to the frame F4 is executed repeatedly. In other words, the tilting control of the LiDAR unit 144*a* executed during the acquisition period of the frame F1 to the frame F4 is executed repeatedly. Angular positions of the scanning lines L1 to L3 in the up-and-down direction when the frame F5 is acquired correspond to the angular positions of the scanning lines L1 to L3 when the frame F1 is acquired. Further, angular positions of the scanning lines L1 to L3 in the up-and-down direction when the frame F6 is acquired correspond to the angular positions of the scanning lines L1 to L3 when the frame F2 is acquired.

The LiDAR control module 1430*a* generates surrounding environment information I2 based on the frames F1 to F4 of the point group data. To describe this in detail, the LiDAR control module 1430*a* generates surrounding environment information I2 by fusing the frames F1 to F4 together. In this way, since the angular position of the detection area S12 (the scanning line) of the LiDAR unit 144*a* in the up-and-down direction differs every time each of the frames is acquired, fusing the frames together can expand the detection area of the LiDAR unit 144*a* in the up-and-down direction. In particular, in the example shown in FIG. 17, while the angular range of the detection area S12 is six degrees, the angular range of the detection area S120 is 12 degrees (=2×6 degrees).

Further, in this example, with one of the three scanning lines L1 to L3 coinciding with the reference line, the scanning lines L1 to L3 move by a predetermined angle in the up-and-down direction between the frames. In this way, since the reference line is scanned by the laser beam, the accuracy of information on a target object existing in the vicinity of the reference line can be improved.

Figure 18A:
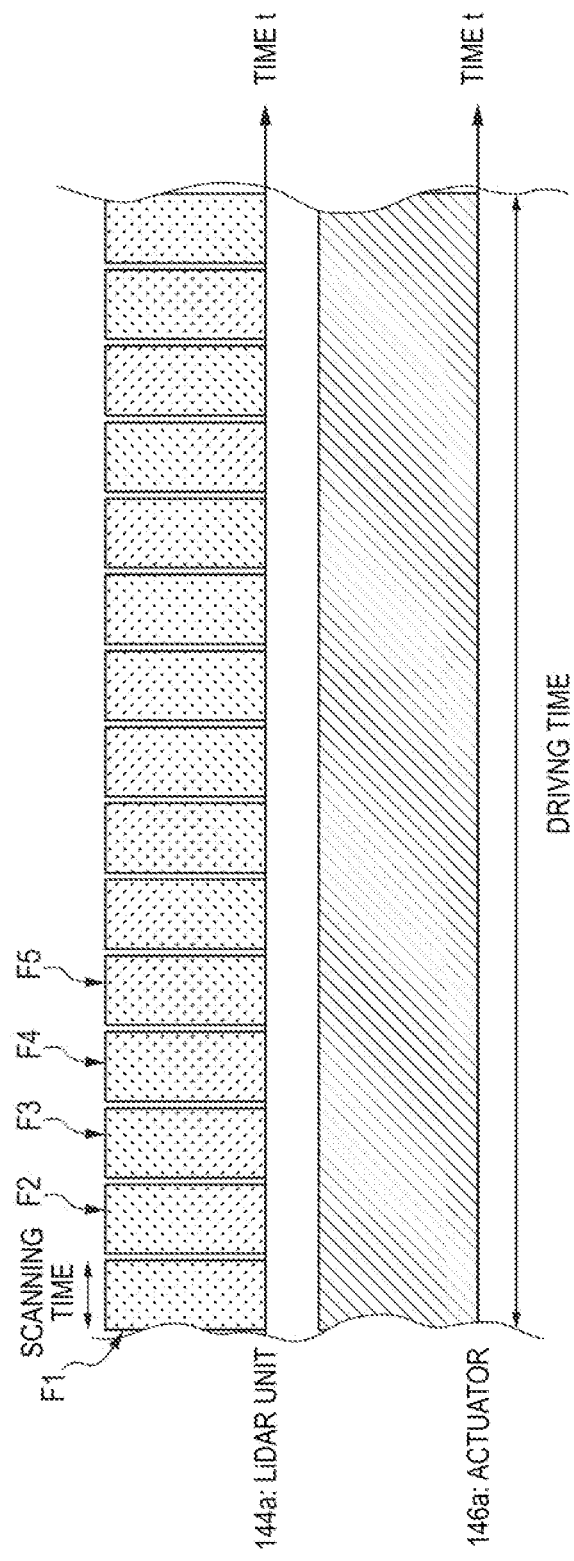
FIG. 18A is a drawing (Part 2) explaining a relationship between the scanning time of the LiDAR unit and the driving time of the actuator.
Figure 18B:
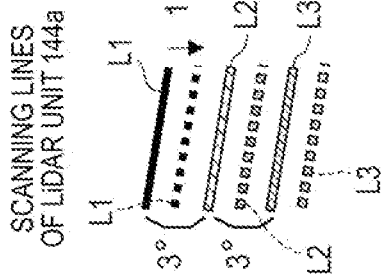
FIG. 18B is a drawing showing the three scanning lines of the LiDAR unit in a tilting control of the LiDAR unit shown in FIG. 18A.

Next, referring to FIGS. 18A, 18B, a further example of the tilting control of the LiDAR unit 144a will be described. FIG. 18A is a drawing explaining a relationship between the scanning time of the LiDAR unit 144a and the driving time of the actuator 146a. FIG. 18B is a drawing showing the three scanning lines L1 to L3 of the LiDAR unit 144a in a tilting control of the LiDAR unit 144a shown in FIG. 18A.

As shown in FIG. 18, the actuator control module 1460a causes the actuator 146a to be driven during the scanning time during which the LiDAR unit 144a is scanning a laser beam. For example, the actuator 146a causes the LiDAR unit 144a to tilt relative to the up-and-down direction while the LiDAR unit 144a scans the laser beam to acquire the frame F2 of the point group data. In this way, unlike the example shown in FIG. 15, the actuator control module 1460a controls to drive the actuator 146a so that the scanning time of the LiDAR unit 144a and the driving time of the actuator 146a overlap each other.

On the other hand, since the actuator 146a tilts the LiDAR unit 144a in the up-and-down direction while the LiDAR 144a is scanning a laser beam, the scanning lines L1 to L3 tilt as shown in FIG. 18B. For example, when the LiDAR unit 144a scans a laser bean while the actuator 146a causes the LiDAR unit 144a to tilt towards the rear, the scanning lines L1 to L3 tilt as shown in FIG. 18B. In particular, an angle difference in the up-and-down direction is generated between one end (an initiating point) and the other end (a terminating point) of the scanning line. Additionally, when the LiDAR unit 144a is caused to move 1.5 degrees further towards the rear with the LiDAR unit 144a caused to tilt towards the rear, the scanning lines L1 to L3 tilt as indicated by broken lines.

Thus, in this example, although the scanning lines L1 to L3 tilt since the actuator 146a is driven during the scanning time of the LiDAR unit 144a, a great reduction in updating rate (Hz) of the surrounding environment information I2 obtained by fusing the plurality of frames of the point group data can be avoided. In this way, the detection area in the up-and-down direction of the LiDAR unit 144a can be expanded while avoiding the great reduction in updating rate of the surrounding environment information I2 based on the point group data.

Figure 19:
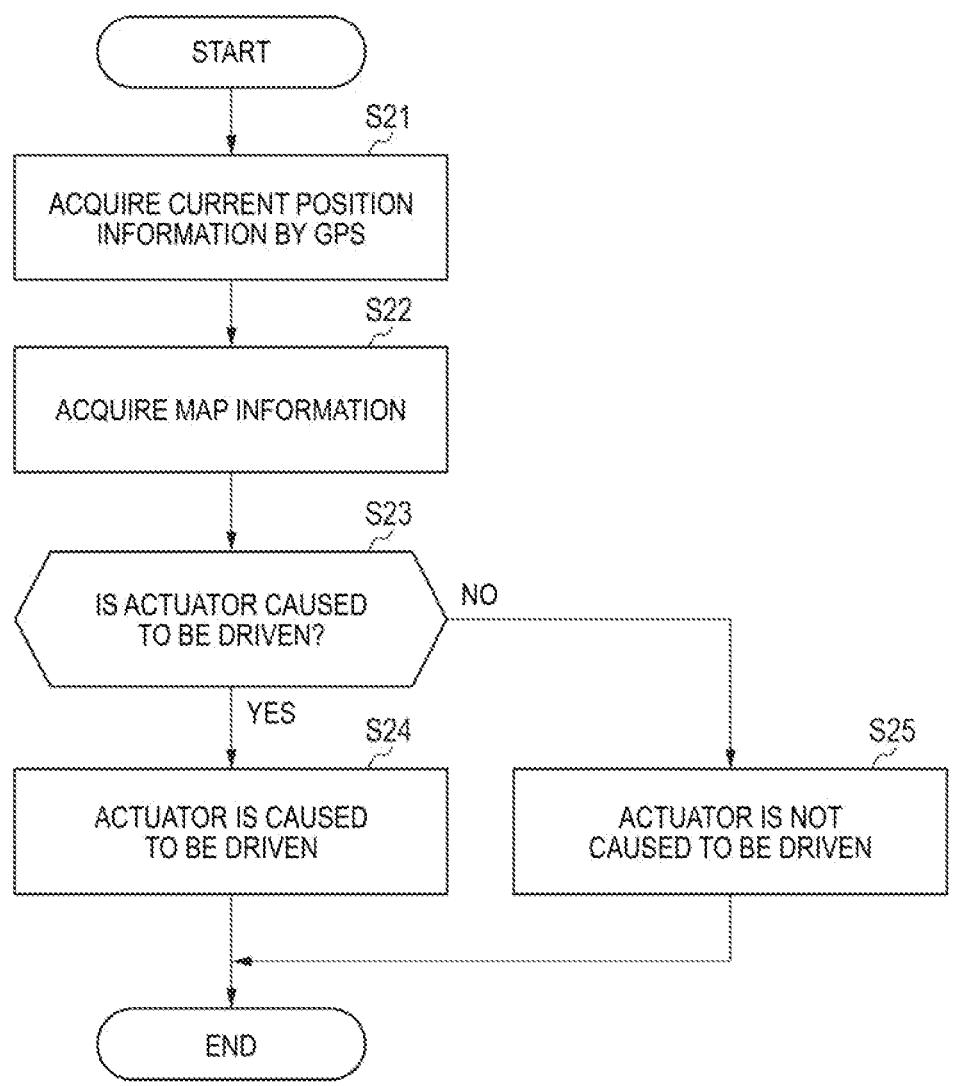
FIG. 19 is a flow chart for explaining an example of a process of determining whether the actuator is driven according to a current position of a vehicle.

Next, referring to FIG. 19, an example of a process of determining whether the actuator 146a is driven according to a current position of the vehicle 101 will be described. FIG. 19 is a flow chart for explaining an example of a process of determining whether the actuator 146a is driven according to a current position of the vehicle 101.

As shown in FIG. 19, in step S21, the vehicle control unit 103 (refer to FIG. 9) acquires information indicating a current position of the vehicle 101 (current position information) using the GPS 9. Next, the vehicle control unit 103 acquires map information from the storage unit 11 in step S22. Thereafter, the vehicle control unit 103 transmits the current position information and the map information to the actuator control module 1460a of the control unit 140a. Next, the actuator control module 1460a determines whether the actuator 146a is to be driven based on the current position information and the map information that the actuator control module 1460a receives (step S23).

For example, the actuator control module 1460a determines whether the vehicle 101 is positioned at a place where many target objects (pedestrians or the like) exist (for example, an intersection or a crowded street) based on the current position information and the map information. If the actuator control module 1460a determines that the vehicle 101 is positioned in the place where many target objects exist (YES in step S23), the actuator control module 1460a drives the actuator 146a to thereby cause the LiDAR unit 144a to tilt relative to the up-and-down direction (step S24). On the other hand, if the actuator control module 1460a determines that the vehicle 101 is not positioned in the place where many target objects exist (NO in step S23), the actuator control module 1460a does not drive the actuator 146a (step S25). In step S25, the LiDAR unit 144a scans a laser beam with the LiDAR unit 144a staying horizontal so as not to tilt relative to the up-and-down direction.

In this way, since the tilting control of the LiDAR unit 144a using the actuator 146a is executed when the vehicle 101 is positioned in the place where many target objects exist, the detection area of the LiDAR unit 144a in the up-and-down direction can be expanded. Consequently, the information on the target objects existing around the vehicle 101 can be acquired with high accuracy.

In addition, as another example, in step S23, the actuator control module 1460a may determine whether the vehicle 101 is positioned on a motorway (a highway or the like) based on the current position information and the map information. If the actuator control module 1460a determines that the vehicle 101 is positioned on the motorway (NO in step S23), the actuator control module 1460a does not drive the actuator 146a (step S25). On the other hand, if the actuator control module 1460a determines that the vehicle 101 is positioned on the motorway (YES in step S23), the actuator control module 1460a drives the actuator 146a to thereby cause the LiDAR unit 144a to tilt relative to the up-and-down direction (step S24).

In this way, when the vehicle 101 is positioned on the motorway, since the tilting control of the LiDAR unit 144a using the actuator 146a is not executed, the updating rate (Hz) of the surrounding environment information I2 based on the point group data can be maintained. In particular, when the vehicle 101 is positioned on the motorway, since it is anticipated that the vehicle 101 runs at high speeds, maintaining the updating rate of the surrounding environment information I2 is prioritized over the expansion of the detection area in the up-and-down direction.

According to the present embodiment, since whether the actuator 146a is driven is determined according to the current position of the vehicle 101, optimum surrounding environment information according to the current position of the vehicle 101 can be obtained. The series of operations shown in FIG. 19 may be executed repeatedly at a predetermined cycle.

Figure 20:
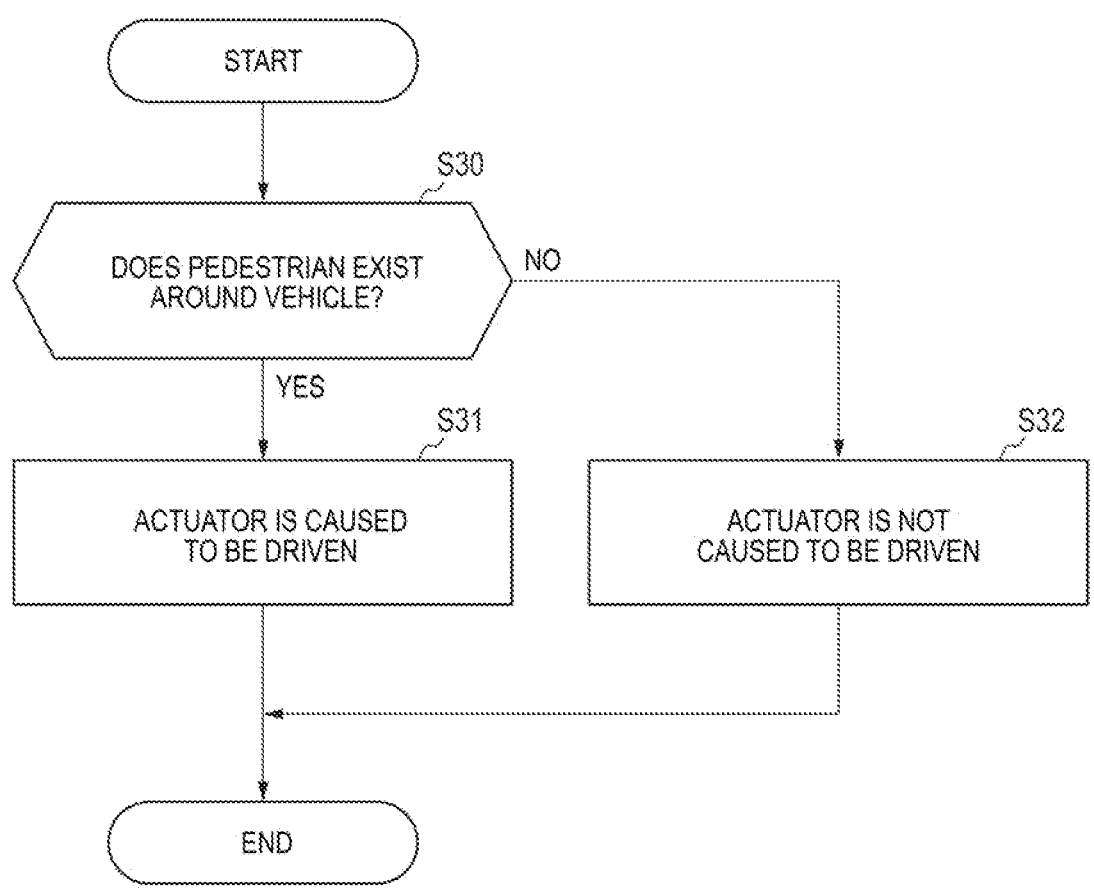
FIG. 20 is a flow chart for explaining an example of a process of determining whether the actuator is driven according to a pedestrian existing around the vehicle.

Next, referring to FIG. 20, an example of a process of determining whether the actuator 146a is driven according to a pedestrian existing around the vehicle 101 will be described. FIG. 20 is a flow chart for explaining an example of a process of determining whether the actuator 146a is driven according to a pedestrian existing around the vehicle 101.

As shown in FIG. 20, in step S30, the LiDAR control module 1430a determines whether a pedestrian exists around the vehicle 101 (in particular, the detection area S12 of the LiDAR unit 144a) based on point group data acquired from the LiDAR unit 144a. Next, if the LiDAR control module 1430a determines that a pedestrian exists around the vehicle 101 (YES in step S30), the LiDAR control module 1430a transmits information indicating the existence of the pedestrian to the actuator control module 1460a. Thereafter, the actuator control module 1460a drives the actuator 146a in response to the receipt of the information indicating the existence of the pedestrian to thereby cause the LiDAR unit 144a to tilt relative to the up-and-down direction (step S31). On the other hand, if the LiDAR control module 1430a determines that no pedestrian exists around the vehicle 101 (NO in step S30), the LiDAR control module 1430a transmits information indicating the nonexistence of the pedestrian to the actuator control module 1460a. Thereafter, the actuator control module 1460a does not drive the actuator in response to the receipt of the information indicating the nonexistence of the pedestrian (step S32). That is, the LiDAR unit 144a scans a laser beam with the LiDAR unit 144a staying horizontal so as not to tilt relative to the up-and-down direction.

In this way, according to the present embodiment, the actuator 146a is driven according to the pedestrian existing around the vehicle 101. In other words, the tilting control of the LiDAR unit 144a is executed when the pedestrian is detected around the vehicle 101 (specifically, within the detection area 12). In this way, the accuracy of the information on the pedestrian can be improved by expanding the detection area of the LiDAR unit 144a in the up-and-down direction. In the present embodiment, although the LiDAR control module 1430a determines on the existence of a pedestrian, the camera control module 1420a may determine on the existence of a pedestrian based on image data acquired from the camera 143a. Additionally, the millimeter wave radar control module 1440a may determine the existence of a pedestrian based on detection data acquired from the millimeter wave radar 145a.

Figure 21:
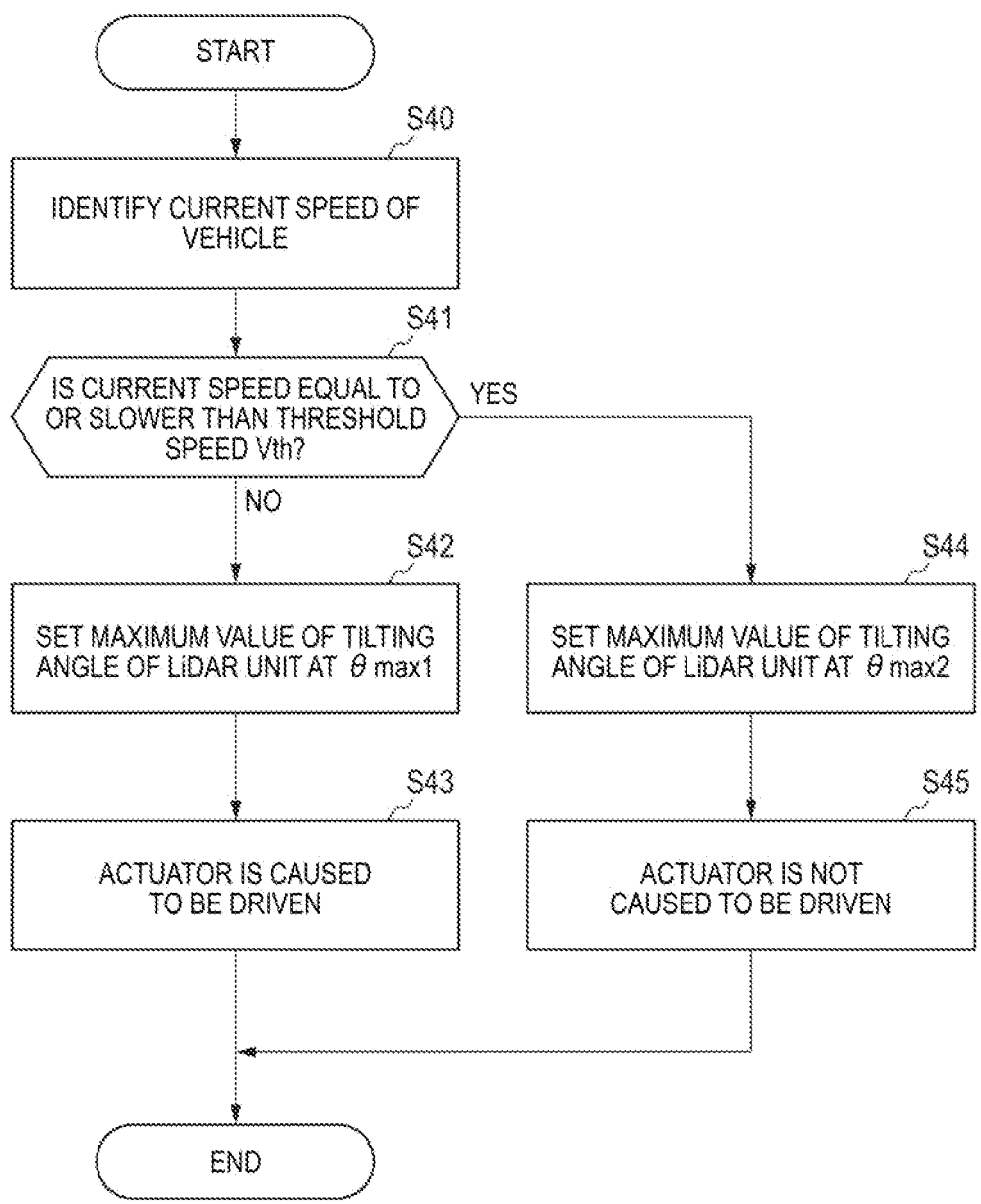
FIG. 21 is a flow chart for explaining an example of a process of determining a maximum value of a tilt angle of the LiDAR unit in the up-and-down direction according to a current speed of the vehicle.
Figure 22A:
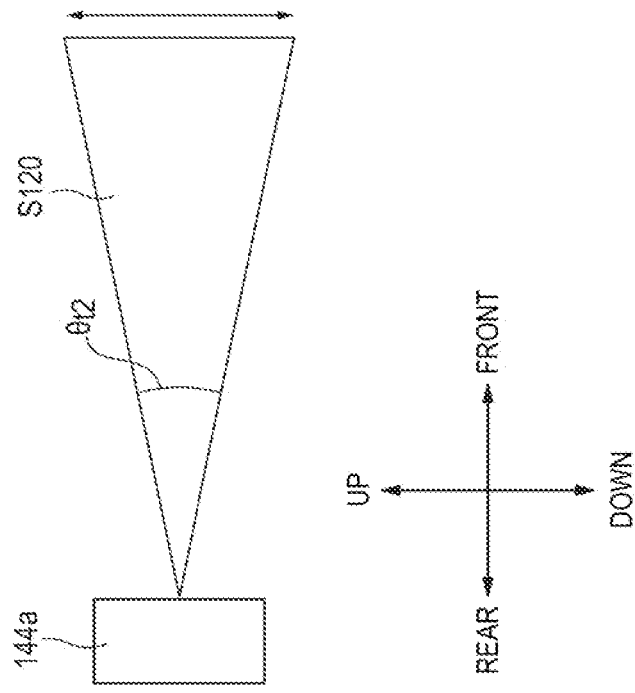
FIG. 22A is a drawing showing a detection area by the LiDAR unit in the up-and-down direction when the current speed of the vehicle is fast.
Figure 22B:
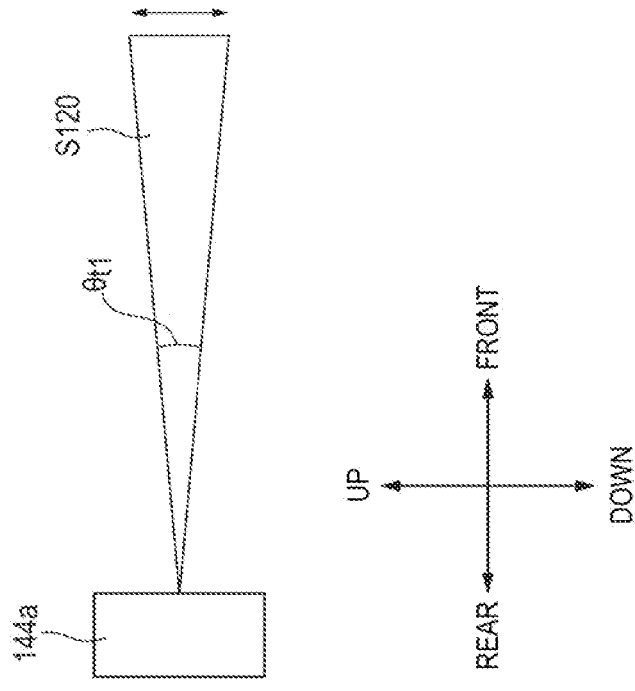
FIG. 22B is a drawing showing a detection area by the LiDAR unit in the up-and-down direction when the current speed of the vehicle is slow.

Next, referring to FIGS. 21 and 22, an example of a process of determining a maximum value of a tilt angle (a maximum tilt angle) of the LiDAR unit 144a in the up-and-down direction according to a speed of the vehicle 101. FIG. 21 is a flow chart for explaining an example of a process of determining a maximum value of a tilt angle of the LiDAR unit 144a in the up-and-down direction according to a current speed V of the vehicle 101. FIG. 22A is a drawing showing a detection area S120 in the up-and-down direction of the LiDAR unit 144a when the current speed V of the vehicle 101 is fast. FIG. 22B is a drawing showing a detection area S120 in the up-and-down direction of the LiDAR unit 144a when the current speed V of the vehicle 101 is slow.

As shown in FIG. 21, in step S40, the vehicle control unit 103 identifies a current speed V of the vehicle 101 based on data transmitted from the sensor 5 (the vehicle speed sensor). Next, the vehicle control unit 103 determines whether the current speed V is equal to or slower than a threshold speed Vth (step S41). For example, the threshold speed Vth can be appropriately set in accordance with a type of the vehicle 101 or a region (a country or the like) where the vehicle 101 is driven. The threshold speed Vth is, for example, 60 km/h.

If the vehicle control unit 103 determines that the current speed V is not equal to or slower than the threshold speed Vth (NO in step S41), the vehicle control unit 103 transmits information indicating that the current speed V is fast to the actuator control module 1460a of the control unit 140a. Next, the actuator control module 1460a sets the maximum value of the tilt angle of the LiDAR unit 144a at θmax1 in response to the receipt of the information indicating that the current speed V is fast (step S42). In the case that the current speed V is fast, as shown in FIG. 22A, an angular range θt1 of the detection area S120 of the LiDAR unit 144a in the up-and-down direction is expressed by the following expression (2). Here, the maximum value of the tilt angle of the LiDAR unit 144a in the front direction is set to θmax1. The maximum value of the maximum tilt angle of the LiDAR unit 144a in the rear direction is also set to θmax1. Additionally, the angular range of the detection area S12 is referred to as θ1.

$$\text{Angular range } \theta t1 = \theta 1 + 2\theta max1 \quad (2)$$

Next, the actuator control module 1460a controls and drives the actuator 146a so that the angular range of the detection range S21 in the up-and-down direction becomes θt1 (step S43).

On the other hand, if the vehicle control unit 103 determines that the current speed V is equal to or smaller than the threshold speed Vth (YES in step S41), the vehicle control unit 103 transmits information indicating that the current speed V is slow to the actuator control module 1460a. Next, the actuator control module 1460a sets the maximum value of the tilt angle of the LiDAR unit 144a to θmax2 (>θmax1) in response to the receipt of the information indicating that the current speed V is slow (step S44). In the case that the current speed V is slow, as shown in FIG. 22B, an angular range θt2 of the detection area S120 of the LiDAR unit 144a in the up-and-down direction is expressed by the following expression (3). Here, the maximum value of the tilt angle of the LiDAR unit 144a in the front direction is set to θmax2, and the maximum value of the maximum tilt angle of the LiDAR unit 144a in the rear direction is also set to θmax2.

$$\text{Angular range } \theta t2 = \theta 1 + 2\theta max2 \quad (3)$$

Next, the actuator control module 1460a controls and drives the actuator 146a such that the angular range of the detection range S21 in the up-and-down direction becomes θt2 (>θt1) (step S45).

According to the present embodiment, when the current vehicle speed V of the vehicle 101 is equal to or smaller than the threshold speed Vth (that is, when the vehicle 101 is running at low speeds), the angular range of the detection area S120 of the LiDAR unit in the up-and-down direction can be increased greatly by causing the LiDAR unit 144a to tilt greatly relative to the up-and-down direction (that is, by increasing greatly the maximum value of the tilt angle of the LiDAR unit 144a). On the other hand, when the current vehicle speed V of the vehicle 101 is greater than the threshold speed Vth (that is, when the vehicle 101 is running at high speeds), the scanning resolution of the LiDAR unit 144a can be made high by reducing the maximum value of the tilt angle of the LiDAR unit 144a. Alternatively, a great reduction in updating rate of the surrounding environment information based on the point group data can be avoided.

Figure 24:
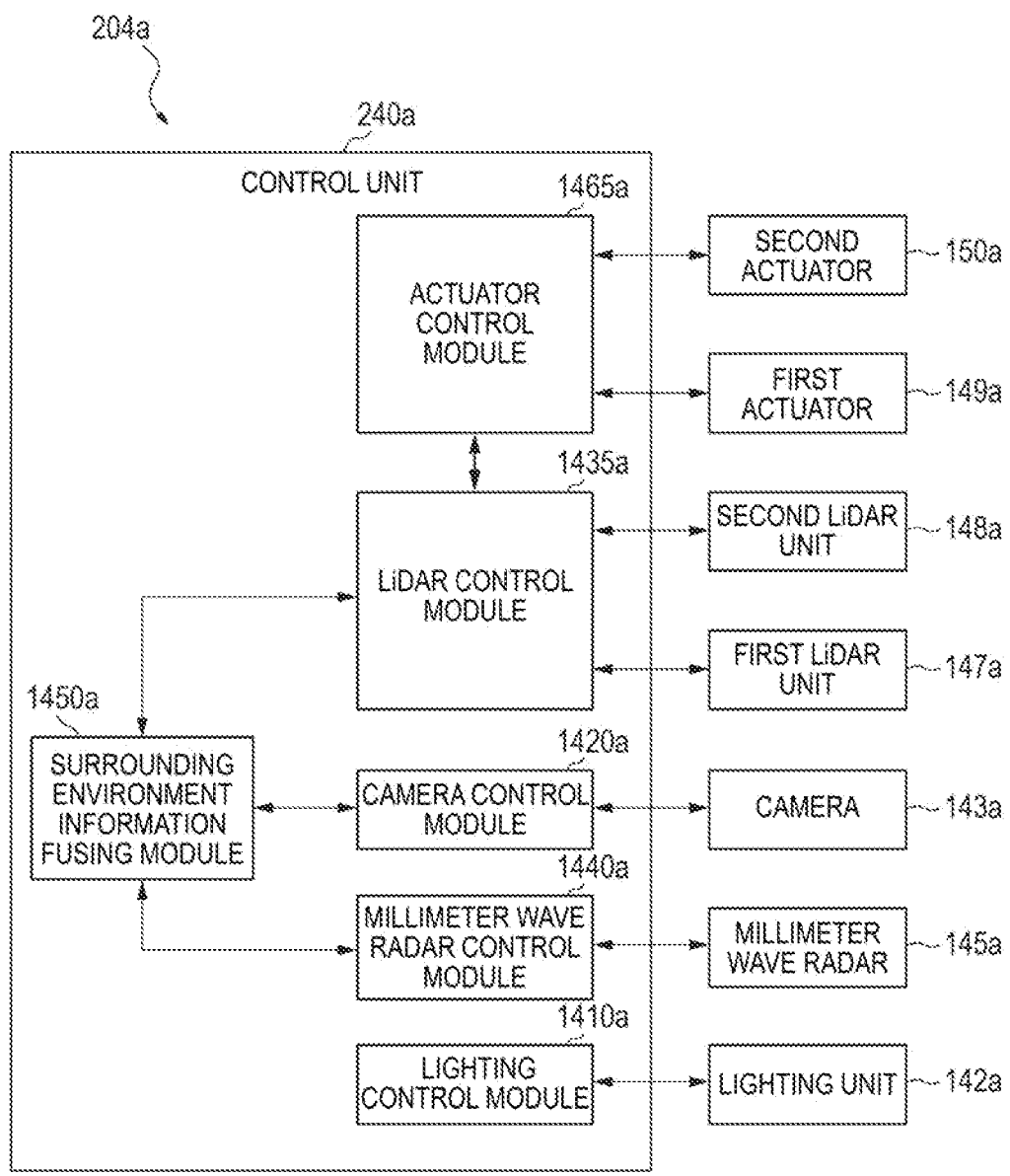
FIG. 24 is a functional block drawing of a control unit for a left front lighting system according to a modified example.

Next, referring to FIGS. 23 and 24, a left front lighting system 204a (hereinafter, referred to simply as a lighting system 204a) according to a first modified example of the second embodiment will be described. FIG. 23A is a drawing showing detection areas S22, S23 in a horizontal direction of two LiDAR units (a first LiDAR unit 147a and a second LiDAR unit 148a) arranged in an up-and-down direction. FIG. 23B is a drawing showing the detection areas S22, S23 in the up-and-down direction of the two LiDAR units 147a, 148a arranged in the up-and-down direction. FIG. 24 is a drawing showing functional blocks of a control unit 240a of the lighting system 204a. The lighting system 204a differs from the lighting system 104a that has already been described in that the two LiDAR units and two actuators are provided.

As shown in FIG. 23, the two LiDAR units 147a, 148a are disposed to overlap with each other when seen from a top. In other words, the two LiDAR units 147a, 148a are arranged in the up-and-down direction. When seen from the top, the first LiDAR unit 147a may be disposed to entirely overlap with the second LiDAR unit 148a or may be disposed to partially overlap with the first LiDAR unit 147a. The detection area S22 of the first LiDAR unit 147a is a detection area expanded in the up-and-down direction that is obtained by a tilting control of the first LiDAR unit 147a using an actuator 149a. On the other hand, the detection area S23 of the second LiDAR unit 148a is a detection area expanded in the up-and-down direction that is obtained by a tilting control of the second LiDAR unit 148a using an actuator 150a. Angular ranges of the detection areas S22, S23 in the horizontal direction coincide with each other. On the other hand, angular ranges of the detection areas S22, S23 in the up-and-down direction may coincide with each other or may differ from each other.

As shown in FIG. 24, the control unit 240a is configured to control individual operations of a lighting unit 142a, a millimeter wave radar 145a, a camera 143a, the LiDAR unit 147a, the second LiDAR unit 148a, the first actuator 149a, and the second actuator 150a. In particular, the control unit 240a includes a lighting control module 1410a, a millimeter wave radar control module 1440a, a camera control module 1420a, a LiDAR control module 1435a, an actuator control module 1460a, and a surrounding environment information fusing module 1450a.

The LiDAR control module 1435a is configured to control operations of the first LiDAR unit 147a and the second LiDAR unit 148a. The LiDAR control module 1435a is configured to generate surrounding environment information in the detection area S22 of the first LiDAR unit 147a based on point group data outputted from the first LiDAR unit 147a. Further, the LiDAR control module 1435a is configured to generate surrounding environment information in the detection area S12 of the second LiDAR unit 148a based on point group data outputted from the second LiDAR unit 148a.

The first actuator 149a is configured to change the tilt angle of the first LiDAR unit 147a in the up-and-down direction. The second actuator 150a is configured to change the tilt angle of the second LiDAR unit 148a in the up-and-down direction. For example, the two actuators 149a, 150a may have a similar configuration to that of the actuator 146a shown in FIG. 12 and may include an electromagnetic solenoid and a shaft connected to the electromagnetic solenoid. As shown in FIG. 8, the two LiDAR units 147a, 148a and the two actuators 149a, 150a are disposed within a space Sa defined by a housing 124a and a transparent cover 122a.

The actuator control module 1465a is configured to control the driving of the first actuator 149a and the second actuator 150a. In particular, the actuator control module 1465a can determine the tilt angle of the first LiDAR unit 147a in the up-and-down by controlling the driving of the first actuator 149a. Further, the actuator control module 1465a can determine the tilt angle of the second LiDAR unit 148a in the up-and-down by controlling the driving of the second actuator 150a.

According to the present modified example, the detection area in the up-and-down direction can be expanded by using the two LiDAR units 147a, 148a that are arranged to overlap with each other when seen from the top. In particular, when a single LiDAR unit is used, a detection area of the LiDAR unit in the up-and-down direction is not wide enough, but the sufficient detection area for the LiDAR unit can be secured in the up-and-down direction by using the two detection areas S22, S23. In this way, information on a target object such as a pedestrian existing around the vehicle 101 (for example, attribute information or the like) can be acquired with high accuracy. The detection areas S22, S23 may partially overlap with each other in the up-and-down direction. Similar to the lighting system 204a, the right front lighting system, the left rear lighting system, and the right rear lighting system may each have two LiDAR units and two actuators.

Figure 25A:
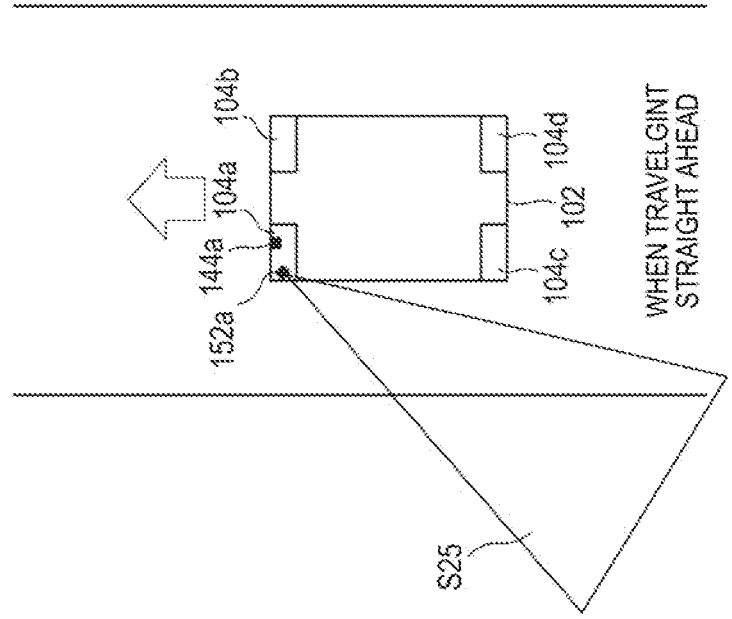
FIG. 25A is a drawing showing a detection area by a LiDAR unit configured to detect a side area of a vehicle when the vehicle enters an intersection.
Figure 25B:
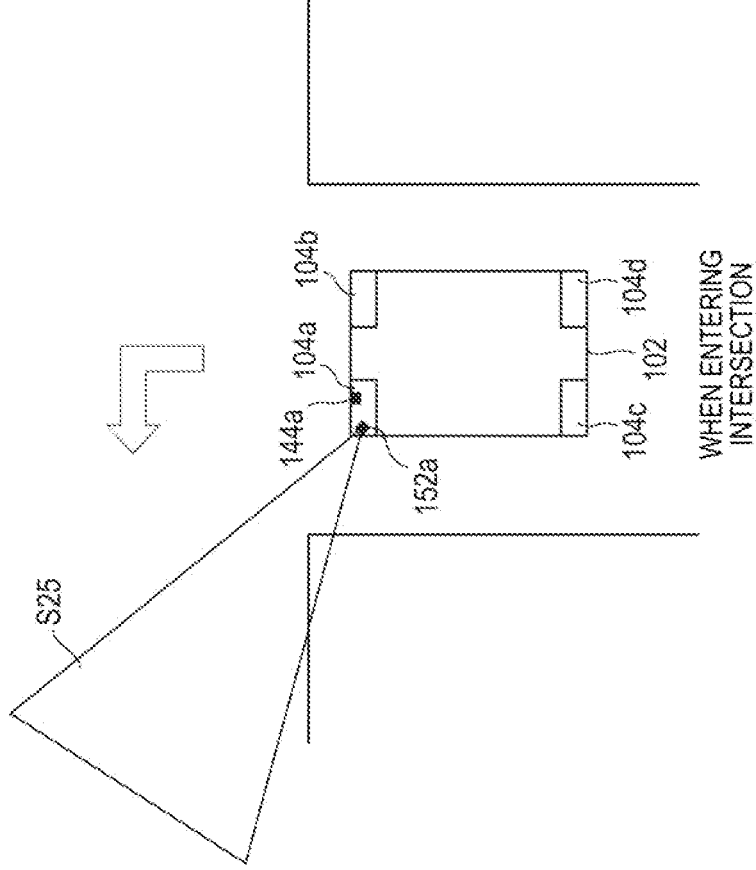
FIG. 25B is a drawing showing a detection area by the LiDAR unit configured to detect the side area of the vehicle when the vehicle travels straight ahead.

Next, referring to FIG. 25, an operation of a LiDAR unit 152a mounted in the lighting system 104a will be described. FIG. 25A is a drawing showing an example of a detection area S25 of the LiDAR unit 152a when the vehicle 101 enters an intersection. FIG. 25B is a drawing showing the detection area S25 of the LiDAR unit 152a when the vehicle 101 is traveling straight ahead.

In this example, the lighting system 104a includes two LiDAR units. One of the two LiDAR units is a LiDAR unit 144a configured to detect a surrounding environment in a front area of the vehicle 101. The other of the two LiDAR units is a LiDAR unit 152a configured to detect a surrounding environment in a side area of the vehicle 101. An actuator (not shown) is configured to rotate the LiDAR unit 152a in a horizontal direction. In addition, an actuator control module 1460a (refer to FIG. 10) can determine a direction of an emission surface of the LiDAR unit 152a in the horizontal direction by controlling the driving of the actuator. In particular, the actuator control module 1460a can move the detection area S25 of the LiDAR unit 152a by controlling the driving of the actuator. As shown in FIG. 8, the two LiDAR units 144a, 152a are disposed within a space Sa defined by a housing 124a and a transparent cover 122a.

For example, as shown in FIG. 25B, the actuator control module 1460a controls the actuator so that the emission surface (or the detection area S25) of the LiDAR unit 152a is directed to a left rear side of the vehicle 101 while the vehicle 101 is traveling straight ahead. In this way, the LiDAR unit 152a can detect a surrounding environment of the vehicle 101 in a left rear area of the vehicle 101 while the vehicle 101 is traveling straight ahead. On the other hand, as shown in FIG. 25A, when the vehicle 101 enters an intersection, the actuator control module 1460a controls the actuator so that the emission surface (or the detection area S25) of the LiDAR unit 152a is directed to a left front side of the vehicle 101. In this way, the LiDAR unit 152a can detect a surrounding environment of the vehicle 101 in a left front area of the vehicle 101 while the vehicle 101 is entering the intersection. In this respect, when the vehicle 101 is taking a left turn, since surrounding environment information of the vehicle 101 in the left front area of the vehicle 101 becomes important, the actuator is preferably controlled so that the emission surface of the LiDAR unit 152a is directed to the left front side of the vehicle 101. Consequently, optimum surrounding environment information can be acquired depending on the situation of the vehicle 101.

Additionally, similar to the lighting system 104a, the lighting system 104b may include a LiDAR unit configured to detect surrounding environment information in a front area of the vehicle 101 and a LiDAR unit configured to detect surrounding environment information in a side area of the vehicle 101. Further, the lighting systems 104c, 4d may each include a LiDAR unit configured to detect surrounding environment information in a rear area of the vehicle 101 and a LiDAR unit configured to detect surrounding environment information in a side area of the vehicle 101.

Thus, while the embodiments of the present invention have been described heretofore, needless to say, the technical scope of the present invention should not be construed as being limited by those embodiments. The embodiments represent only the examples, and hence, it is to be understood by those skilled in the art to which the present invention pertains that the embodiments can be modified variously without departing from the scope of the claimed inventions. The technical scope of the present invention should be defined based on a scope defined by inventions described in the claims and a scope of equivalents thereof.

In the embodiments, while the driving mode of the vehicle is described as including the complete autonomous driving mode, the high-degree driving assistance mode, the driving assistance mode, and the manual driving mode, the driving mode of the vehicle is not limited to these four driving modes. The division of the driving mode of the vehicle may be changed as required in accordance with regulations and rules regarding autonomous driving in various countries. Similarly, the definitions of the "complete autonomous driving mode, the "high-degree driving assistance mode", and the "driving assistance mode" that are described in the embodiments constitute only the examples, and hence, these definitions may be changed as required in accordance with the regulations and rules regarding autonomous driving in the various countries.

What is claimed is:

1. A sensing system provided in a vehicle capable of running in an autonomous driving mode, the sensing system comprising:
   a LiDAR configured to acquire point group data indicating surrounding environment of the vehicle;
   a processor programmed to acquire surrounding environment information indicating the surrounding environment of the vehicle, based on the point group data acquired from the LiDAR unit;
   an actuator configured to change a tilt angle of the LiDAR relative to an up-and-down direction of the vehicle between each scanning frame of the LIDAR in a predetermined manner;
   wherein the processor is programmed to control a driving of the actuator.

2. The sensing system according to claim 1,
   wherein when the tilt angle of the LiDAR is a first tilt angle, the LiDAR acquires a first frame of the point group data,
   wherein when the tilt angle of the LiDAR is a second tilt angle which is different from the first tilt angle, the LiDAR acquires a second frame of the point group data, and
   wherein the processor acquires the surrounding environment information based on the first fame and the second frame.

3. The sensing system according to claim 2, wherein
   the processor does not cause the actuator to be driven during a first scanning time of the LiDAR during which the first frame is acquired and a second scanning time of the LiDAR during which the second frame is acquired.

4. The sensing system according to claim 2, wherein
   the processor causes the actuator to be driven during a first scanning time of the LiDAR during which the first frame is acquired and a second scanning time of the LiDAR during which the second frame is acquired.

5. The sensing system according to claim 1, wherein
   the processor is configured to determine whether the actuator is caused to be driven according to a current position of the vehicle.

6. The sensing system according to claim 1, wherein
   the processor is configured to determine a maximum value of the tilt angle of the LiDAR according to a current speed of the vehicle.

7. The sensing system according to claim 1, wherein
   the processor is configured to cause the actuator to be driven in response to a detection of a pedestrian existing around the vehicle.

8. The sensing system according to claim 1, wherein
   the actuator is configured to gradually change the tilt angle of the LiDAR at a first angular interval within a predetermined angular area with respect to a horizontal direction of the vehicle, and
   the actuator is configured to gradually change the tilt angle of the LiDAR at a second angular interval which is greater than the first angular pitch interval.

9. The sensing system according to claim 1,
   wherein the LiDAR comprises a first LiDAR and a second LiDAR,
   wherein the first LiDAR and the second LiDAR are arranged to overlap with each other when seen from a top,
   wherein the actuator comprises:
   a first actuator configured to change a tilt angle of the first LiDAR relative to the up-and-down direction; and
   a second actuator configured to change a tilt angle of the second LiDAR relative to the up-and-down direction.

10. A vehicle capable of running in an autonomous driving mode, comprising the sensing system according to claim 1.

11. The sensing system according to claim 1, wherein
    the LiDAR is configured to scan a laser beam at a predetermined angular pitch in a horizontal direction of the vehicle and a predetermined angular pitch in an up-and-down direction of the vehicle, thereby generating the point group data.

* * * * *